US009616852B2

(12) United States Patent
Kasahara et al.

(10) Patent No.: US 9,616,852 B2
(45) Date of Patent: Apr. 11, 2017

(54) IMAGE PROCESSING APPARATUS, IMAGE-CAPTURING METHOD, AND VEHICLE

(71) Applicants: Ryosuke Kasahara, Kanagawa (JP); Hideaki Hirai, Kanagawa (JP)

(72) Inventors: Ryosuke Kasahara, Kanagawa (JP); Hideaki Hirai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 232 days.

(21) Appl. No.: 14/354,210

(22) PCT Filed: Nov. 1, 2012

(86) PCT No.: PCT/JP2012/078907
§ 371 (c)(1),
(2) Date: Apr. 25, 2014

(87) PCT Pub. No.: WO2013/065870
PCT Pub. Date: May 10, 2013

(65) Prior Publication Data
US 2014/0321709 A1    Oct. 30, 2014

(30) Foreign Application Priority Data

Nov. 2, 2011   (JP) .................................. 2011-241698
Sep. 13, 2012  (JP) .................................. 2012-202111

(51) Int. Cl.
*G06K 9/00*       (2006.01)
*B60S 1/08*       (2006.01)
(Continued)

(52) U.S. Cl.
CPC ........ *B60S 1/0844* (2013.01); *G06K 9/00791* (2013.01); *G06K 9/00832* (2013.01);
(Continued)

(58) Field of Classification Search
None
See application file for complete search history.

(56) References Cited

U.S. PATENT DOCUMENTS 6,323,477 B1   11/2001  Blasing et al.
7,834,922 B2   11/2010  Kurane
(Continued)

FOREIGN PATENT DOCUMENTS

CN   101047786 A      10/2007
DE   102009000003 A1   7/2010
(Continued)

OTHER PUBLICATIONS

Chinese Office Action dated Aug. 19, 2015 issued in corresponding Chinese Application No. 201280053482.6 (with English translation).

(Continued)

*Primary Examiner* — Sean Conner
(74) *Attorney, Agent, or Firm* — Harness, Dickey & Pierce, P.L.C.

(57) ABSTRACT

An image processing apparatus includes a light source configured to emit light onto a glass; an image-capturing unit configured to capture light from an image-capturing region including reflection light of the emitted light from the glass; an object detection filter used to detect an object attached to the glass, light from a portion of the image-capturing region entering the object detection filter; an exposure control unit configured to determine a first exposure amount used in image capturing for a first region where the object detection filter does not exist and a second exposure amount used in image capturing for a second region where the object detection filter exists; and an image analysis unit configured to analyze a captured image obtained by the image-capturing unit. The image-capturing unit switches an exposure amount used in an image-captur- (Continued)

ing process for the image-capturing region between the first exposure amount and the second exposure amount.

10 Claims, 15 Drawing Sheets

(51) Int. Cl.
    *H04N 5/225* (2006.01)
    *G06T 1/00* (2006.01)
    *G06K 9/20* (2006.01)
    *H04N 5/235* (2006.01)
    *H04N 5/353* (2011.01)

(52) U.S. Cl.
    CPC .......... *G06K 9/2027* (2013.01); *G06T 1/0007* (2013.01); *H04N 5/225* (2013.01); *H04N 5/2353* (2013.01); *H04N 5/3535* (2013.01)

(56) References Cited

U.S. PATENT DOCUMENTS

| | | | |
|---|---|---|---|
| 2005/0035926 A1* | 2/2005 | Takenaga | B60S 1/0818 345/8 |
| 2005/0134483 A1* | 6/2005 | Monji | B60Q 1/085 340/933 |
| 2006/0243894 A1 | 11/2006 | Takenaga et al. | |
| 2010/0208060 A1 | 8/2010 | Kobayashi et al. | |
| 2012/0026318 A1 | 2/2012 | Huelsen et al. | |

FOREIGN PATENT DOCUMENTS

| | | |
|---|---|---|
| EP | 1507138 A2 | 2/2005 |
| JP | 62-043543 | 2/1987 |
| JP | 2002-502048 | 1/2002 |
| JP | 2003-315256 | 11/2003 |
| JP | 2005-195566 | 7/2005 |
| JP | 2005-195569 A | 7/2005 |
| JP | 2006-005621 | 1/2006 |
| JP | 2009-092453 | 4/2009 |
| JP | 2010-210607 | 9/2010 |
| JP | 2013-098817 | 5/2013 |

OTHER PUBLICATIONS

Extended European Search Report dated Dec. 8, 2014 issued in corresponding European Application No. 12844757.0.
International Search Report issued on Feb. 26, 2013 in PCT/JP2012/078907 filed on Nov. 1, 2012.
International Written Opinion issued on Feb. 26, 2013 in PCT/JP2012/078907 filed on Nov. 1, 2012.

\* cited by examiner

IMAGE PROCESSING APPARATUS, IMAGE-CAPTURING METHOD, AND VEHICLE

This application is a national phase under 35 U.S.C. §371 of PCT International Application No. PCT/JP2012/078907 which has an International filing date of Nov. 1, 2012, which claims priority to Japanese patent application number JP 2011-241698 filed Nov. 2, 2011 and Japanese patent application number JP 2012-202111 filed Sep. 13, 2012.

TECHNICAL FIELD

The present invention relates to an image processing apparatus, an image-capturing method, and a vehicle.

BACKGROUND ART

A technique for detecting raindrop attached to a windshield in order to automate wiper control while a car runs and a technique using an illumination and an optical filter that passes only a wavelength of illumination light to cause a sensing camera for detecting a lane and the like to also detect raindrops attached to a windshield are known in the past.

For example, Japanese Patent Application Laid-open No. 2005-195566 discloses an image processing system having an image processing apparatus, a light source, and an optical filter for the purpose of using them as not only a sensing camera but also a camera for detecting raindrops, and tracking outside light that changes from time to time by emitting light from the light source and capturing images of raindrops at the outside of the windshield, thus changing the intensity of prepared illumination.

However, in a technique using the configuration as not only a sensing camera but also a camera for detecting raindrops such as the conventional techniques described above, it is necessary to track outside light that changes from time to time and adjust the exposure of an optical filter portion, and accordingly, it is necessary to change the intensity of the prepared illumination. For this reason, an extremely powerful illumination is required, which causes a problem in that the power consumption increases.

In the conventional technique, powerful outside light needs to be emitted to the outside of the vehicle, and this requires higher degree of safety to be ensured.

Therefore, there is a need for an image processing apparatus, an image-capturing method, and a vehicle capable of reducing the power consumption and capable of improving safety even when an image-capturing unit is used not only for sensing but also for detection of objects.

DISCLOSURE OF INVENTION

It is an object of the present invention to at least partially solve the problems in the conventional technology.

According to an embodiment, there is provided an image processing apparatus includes a light source configured to emit light onto a glass; an image-capturing unit configured to capture light from an image-capturing region including reflection light of the emitted light, the reflection light being reflected by the glass; an object detection filter used to detect an object attached to the glass, light from a portion of the image-capturing region entering the object detection filter; an exposure control unit configured to determine a first exposure amount with which an image is captured in a first region of the image-capturing region and a second exposure amount with which an image is captured in a second region of the image-capturing region, the second exposure amount being different from the first exposure amount, the first region being a region where the object detection filter does not exist, the second region being a region where the object detection filter exists; and an image analysis unit configured to analyze a captured image obtained by the image-capturing unit. The image-capturing unit switches an exposure amount used in an image-capturing process for the image-capturing region between the first exposure amount and the second exposure amount.

According to another embodiment, there is provided an image-capturing method executed by an image processing apparatus that includes a light source configured to emit light onto a glass and an object detection filter used to detect an object attached to the glass, light from a portion of the image-capturing region entering the object detection filter. The image-capturing method includes capturing light from an image-capturing region including reflection light of the emitted light, the reflection light being reflected by the glass; determining a first exposure amount with which an image is captured in a first region of the image-capturing region and a second exposure amount with which an image is captured in a second region of the image-capturing region, the second exposure amount being different from the first exposure amount, the first region being a region where the object detection filter does not exist, the second region being a region where the object detection filter exists; and analyzing a captured image obtained at the capturing. The capturing includes switching an exposure amount used in an image-capturing process for the image-capturing region between the first exposure amount and the second exposure amount.

According to still another embodiment, there is provided a vehicle includes a light source configured to emit light onto a glass; an image-capturing unit configured to capture light from an image-capturing region including reflection light of the emitted light, the reflection light being reflected by the glass; an object detection filter used to detect an object attached to the glass, light from a portion of the image-capturing region entering the object detection filter; an exposure control unit configured to determine a first exposure amount with which an image is captured in a first region of the image-capturing region and a second exposure amount with which an image is captured in a second region of the image-capturing region, the second exposure amount being different from the first exposure amount, the first region being a region where the object detection filter does not exist, the second region being a region where the object detection filter exists; an image analysis unit configured to analyze a captured image obtained by the image-capturing unit; and a control unit configured to control at least one of a cruise, a wiper, and a head lamp of the vehicle on the basis of an analysis result of the captured image. The image-capturing unit switches an exposure amount used in an image-capturing process for the image-capturing region between the first exposure amount and the second exposure amount.

The above and other objects, features, advantages and technical and industrial significance of this invention will be better understood by reading the following detailed description of presently preferred embodiments of the invention, when considered in connection with the accompanying drawings.

BEST MODES FOR CARRYING OUT THE INVENTION

Embodiments of an image processing apparatus, an image-capturing method, and a vehicle will be hereinafter explained in detail with reference to attached drawings. It should be noted that the image processing apparatus according to the present invention is not limited to a vehicle-mounted device control system. For example, the image processing apparatus according to the present invention can be applied to other systems having an object detection device for detecting an object on the basis of a captured image.

First Embodiment

Figure 1:
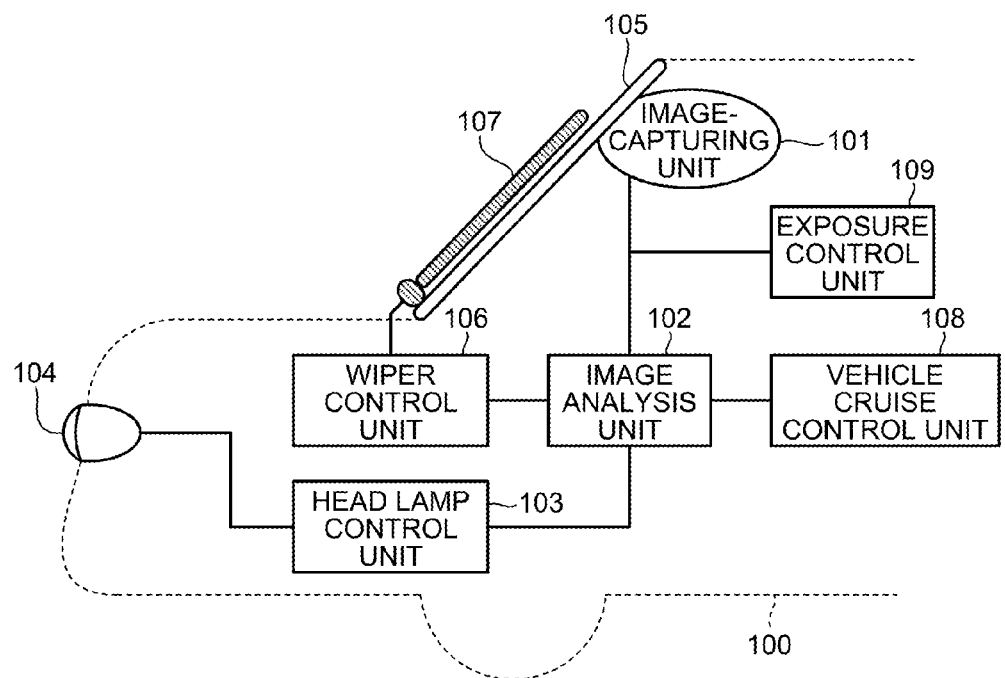
FIG. 1 is a schematic view illustrating a schematic configuration of a vehicle-mounted device control system according to a first embodiment.

FIG. 1 is a schematic view illustrating a schematic configuration of a vehicle-mounted device control system according to a first embodiment. The vehicle-mounted device control system uses a captured image data at a front side region of a moving direction of a driver's vehicle (image-capturing region) captured by an image-capturing device mounted on a driver's vehicle 100 such as a car to perform head lamp luminous intensity distribution control, wiper driving control, and control of other car-mounted devices.

As illustrated in FIG. 1, the vehicle-mounted device control system according to the present embodiment mainly includes an image-capturing unit 101 having an image-capturing device (not illustrated in FIG. 1, see FIG. 2), an exposure control unit 109, an image analysis unit 102, a vehicle cruise control unit 108, a wiper control unit 106, and a head lamp control unit 103. In this case, the vehicle cruise control unit 108, the wiper control unit 106, and the head lamp control unit 103 function as a control unit for controlling operation of the driver's vehicle 100.

The image-capturing device provided in the vehicle-mounted device control system according to the present embodiment is arranged in the image-capturing unit 101, and captures an image at a front side region in an moving direction of the cruising driver's vehicle 100 as an image-capturing region, and is installed, for example, in a proximity of a rearview mirror (not illustrated) of a windshield (glass) 105 of the driver's vehicle 100. The captured image data captured by the image-capturing device of the image-capturing unit 101 are input into the image analysis unit 102.

The exposure control unit 109 controls exposure of the image-capturing device of the image-capturing unit 101. A first exposure amount for capturing an image in a first region of the image-capturing region in which there is no raindrop detection filter explained later and a second exposure amount which is the amount of exposure different from the first exposure amount and which is for capturing an image in a second region of the image-capturing region in which there is the raindrop detection filter are determined. The image-capturing device switches between image-capturing process in the image-capturing region with the first exposure amount determined by this exposure control unit 109 and image-capturing process in the image-capturing region with the second exposure amount thus determined.

The image analysis unit 102 analyzes the captured image data transmitted from the image-capturing device, calculates the position, the direction, and the distance of another vehicle present in front of the driver's vehicle 100 with the captured image data, detects adherents such as a raindrop and a foreign object attached to the windshield 105, detects a detection target object such as a white line (section line) on a road surface existing in the image-capturing region, and calculates rainfall. In the detection of another vehicle, a preceding vehicle moving in the same moving direction as the driver's vehicle 100 is detected by identifying tail lamps of the another vehicle, and an oncoming vehicle moving in the direction opposite to the driver's vehicle 100 is detected by identifying head lamps of the another vehicle.

The calculation result of the image analysis unit 102 is transmitted to the head lamp control unit 103. The head lamp control unit 103 generates a control signal for controlling head lamps 104, i.e., car-mounted devices of the driver's vehicle 100, from, for example, the distance data calculated by the image analysis unit 102. More specifically, for example, in order to ensure visibility of the driver of the driver's vehicle 100 while preventing drivers of other vehicles from being dazzled by preventing strong light from emitting from the head lamps of the driver's vehicle 100 to enter the eyes of the drivers of preceding vehicles and oncoming vehicles, the head lamp control unit 103 performs control so as to switch the head lamps 104 to high beam or low beam, and performs partial shielding control of the head lamps 104.

The calculation result of the image analysis unit 102 is also sent to the wiper control unit 106. The wiper control unit 106 controls a wiper 107 to remove adherent such as raindrop and foreign object attached to the windshield 105 of the driver's vehicle 100. The wiper control unit 106 receives foreign object detection result detected by the image analysis unit 102, and generates a control signal for controlling the wiper 107. When the control signal generated by the wiper control unit 106 is sent to the wiper 107, the wiper 107 is operated in order to ensure visibility of the driver of the driver's vehicle 100.

The calculation result of the image analysis unit 102 is also sent to the vehicle cruise control unit 108. For example, when the driver's vehicle 100 is determined to be out of a lane region divided by white lanes on the basis of the white line detection result detected by the image analysis unit 102, the vehicle cruise control unit 108 performs a notification of a warning to the driver of the driver's vehicle 100 and a cruise support control such as controlling the steering wheel and the brake of the driver's vehicle 100.

Figure 2:
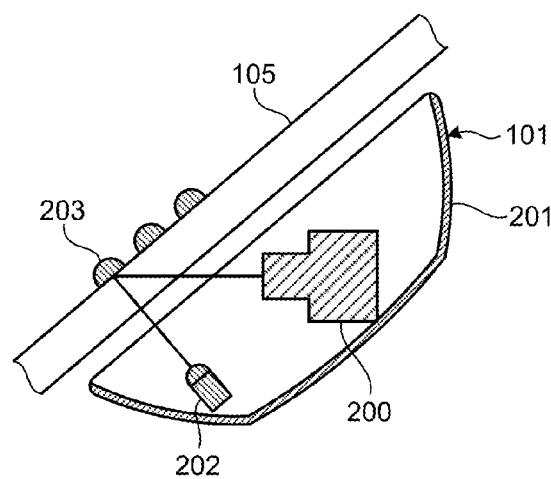
FIG. 2 is a schematic view illustrating a schematic configuration of an image-capturing unit according to the first embodiment.
Figure 3:
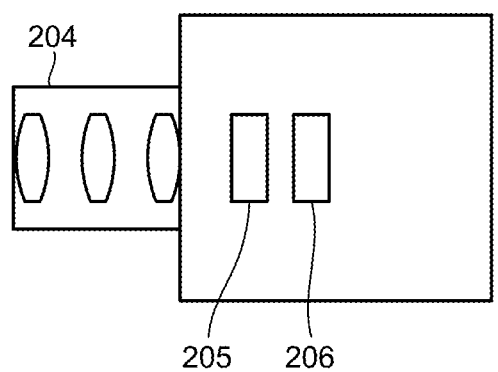
FIG. 3 is an explanatory diagram illustrating a schematic configuration an image-capturing device provided in the image-capturing unit according to the first embodiment.

FIG. 2 is a schematic view illustrating a schematic configuration of the image-capturing unit 101. FIG. 3 is an explanatory diagram illustrating a schematic configuration of an image-capturing device 200 provided in the image-capturing unit 101. The image-capturing unit 101 includes an image-capturing device 200, a light source 202, and an image-capturing case 201 in which the image-capturing device 200 and the light source 202 are accommodated. The image-capturing unit 101 is installed at the inner surface side of the windshield 105 of the driver's vehicle 100. As illustrated in FIG. 3, the image-capturing device 200 includes an image-capturing lens 204, an optical filter 205, and an image sensor 206. The light source 202 emits light toward the windshield 105, and is arranged such that the reflection light of the emitted light that is reflected by the external surface of the windshield 105 enters the image-capturing device 200.

In the present embodiment, the light source 202 is used to detect adherent attached to the external surface of the windshield 105 (for example, hereinafter explained is a case where the adherent is raindrop.). When a raindrop 203 is attached to the external surface of the windshield 105, the light emitted from the light source 202 is reflected by an interface between external air and the external surface of the windshield 105, and the reflected light enters the image-capturing device 200. With this the raindrop 203 attached to the windshield 105 is detected from the captured image data of the image-capturing device 200.

In the present embodiment, as illustrated in FIG. 2, the image-capturing case 201 of the image-capturing unit 101 covers the image-capturing device 200 and the light source 202 with the windshield 105. Since the image-capturing case 201 is thus covered, the windshield 105 covered with the image-capturing unit 101 does not tarnish even when the inner surface of the windshield 105 tarnishes. Therefore, this can prevent the image analysis unit 102 from making false analysis due to tarnish of the windshield 105, and various kinds of control operations can be performed on the basis of the analysis result of the image analysis unit 102.

However, when the tarnish of the windshield 105 is detected from the captured image data of the image-capturing device 200 to, for example, control air-conditioning equipment of the driver's vehicle 100, a path for flowing air may be formed in a portion of the image-capturing case 201 so that the portion of the windshield 105 facing the image-capturing device 200 is under the same condition as the other portion.

In the present embodiment, the focal point position of the image-capturing lens 204 is set at infinity or between the windshield 105 and the infinity. Accordingly, not only when the raindrop 203 attached to the windshield 105 is detected but also when a preceding vehicle or an oncoming vehicle is detected or a white line is detected, information can be appropriately obtained from the captured image data of the image-capturing device 200.

For example, when the raindrop 203 attached to the windshield 105 is to be detected, the shape of the raindrop image on the captured image data is often in a round shape, and accordingly, a determination is made as to whether a raindrop candidate image on the captured image data is in a round shape, and thus, shape recognition processing for identifying that the raindrop candidate image is a raindrop image is performed. When such shape recognition processing is performed, the image is somewhat out of focus when the focal point position of the image-capturing lens 204 is set at infinity or between the windshield 105 and the infinity as described above, rather than when the focal point of the image-capturing lens 204 is on the raindrop 203 on the external surface of the windshield 105, and this increases the rate of shape recognition of raindrop (round shape), and accordingly, the raindrop detection performance is high.

Figure 4:
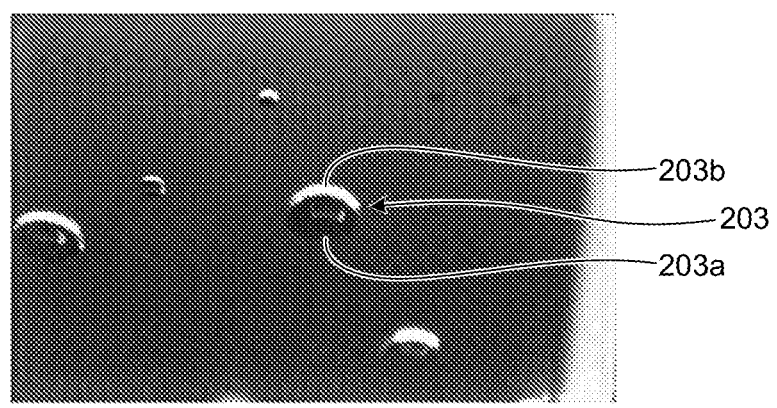
FIG. 4 is an explanatory diagram illustrating infrared light image data which are raindrop detection captured image data, when a focal point of an image-capturing lens is on a raindrop on an external surface of a windshield of a driver's vehicle according to the first embodiment.
Figure 5:
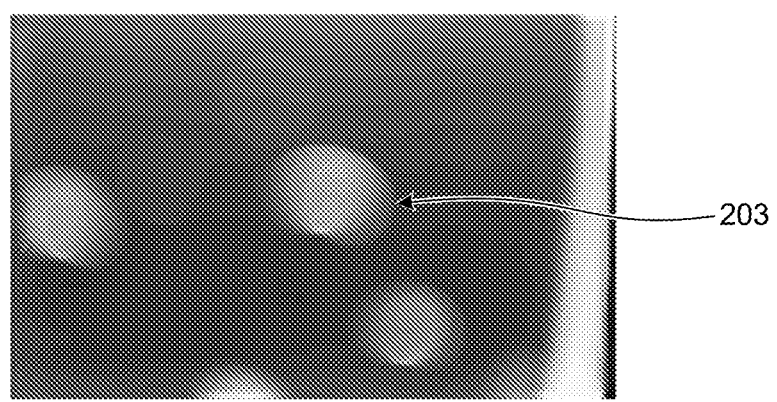
FIG. 5 is an explanatory diagram illustrating infrared light image data which are raindrop detection captured image data when the focal point is at infinity according to the first embodiment.

FIG. 4 is an explanatory diagram illustrating infrared light image data which are raindrop detection captured image data, when the focal point of the image-capturing lens 204 is on the raindrop 203 on the external surface of the windshield 105. FIG. 5 is an explanatory diagram illustrating infrared light image data which are raindrop detection captured image data when the focal point is at infinity. When the focal point of the image-capturing lens 204 is on the raindrop 203 on the external surface of, the windshield 105, even a background image 203a appearing the raindrop is captured as illustrated in FIG. 4. Such background image 203a is a cause of false detection of the raindrop 203. As illustrated in FIG. 4, the brightness may increase in an arch shape and the like only in some portion 203b of the raindrop, and the shape of the high brightness portion, i.e., the shape of the raindrop image, may change in accordance with the position of a streetlamp or a direction of sunlight. When the shape of the raindrop image changing into various shapes is processed by the shape recognition processing, the processing load is high, and the recognition accuracy decreases.

In contrast, when the focal point is at infinity, the image becomes somewhat out of focus as illustrated in FIG. 5. Therefore, the background image 203a appearing in the image is not reflected in the captured image data, and this reduces false detection of the raindrop 203. When the image becomes somewhat out of focus, the degree the shape of the raindrop image changes due to the position of a streetlamp and the direction of sunlight is reduced, and the shape of the raindrop image is always a substantially round shape. Therefore, the load of the shape recognition processing of the raindrop 203 is small, and the recognition accuracy is high.

However, when the focal point is at infinity, about only one light-receiving element of the image sensor 206 may receive light from tail lamps when identifying tail lamps of a preceding vehicle cruising at a distance. Although this case will be explained later in detail, the light of the tail lamps are less likely to be received by a red color light-receiving element for receiving tail lamp color (red color), and at that occasion, the tail lamps are not recognized, and the preceding vehicle cannot be detected. In order to prevent such problem, the focal point of the image-capturing lens 204 is preferably set at a close side with respect to the infinity. Accordingly, the tail lamps of the preceding vehicle cruising at a distance are out of focus, and therefore, the number of light-receiving elements receiving the light of the tail lamps can be increased, and this increases the recognition accuracy of the tail lamps and increases the detection accuracy of the preceding vehicle.

The light source 202 of the image-capturing unit 101 may use a light emitting diode (LED), a semiconductor laser (LD), and the like. The wavelength of the light emitted by the light source 202 may be, for example, visible light or infrared light. When a driver of an oncoming vehicle, pedestrians, and the like are prevented from being dazzled by the light emitted by the light source 202, it is preferable to select a wavelength which is longer than visible light and which is in a range where the light receiving sensitivity of the image sensor 206 can cover, i.e., a wavelength in infrared light region which is equal to or more than 800 nm but is equal to or less than 1000 nm, for example. The light source 202 according to the present embodiment emits light having a wavelength in infrared light region.

In this case, when the infrared wavelength light emitted by the light source 202 and reflected by the windshield 105 is captured by the image-capturing device 200, the image sensor 206 of the image-capturing device 200 receives a large amount of ambient light including not only infrared wavelength light emitted by the light source 202 but also infrared wavelength light such as sunlight. Accordingly, in order to distinguish the infrared wavelength light emitted by the light source 202 from such a large amount of ambient light, the amount of light emitted by the light source 202 needs to be sufficiently larger than the ambient light, but in many cases, it is difficult to use the light source 202 emitting such a large amount of light.

Figure 6:
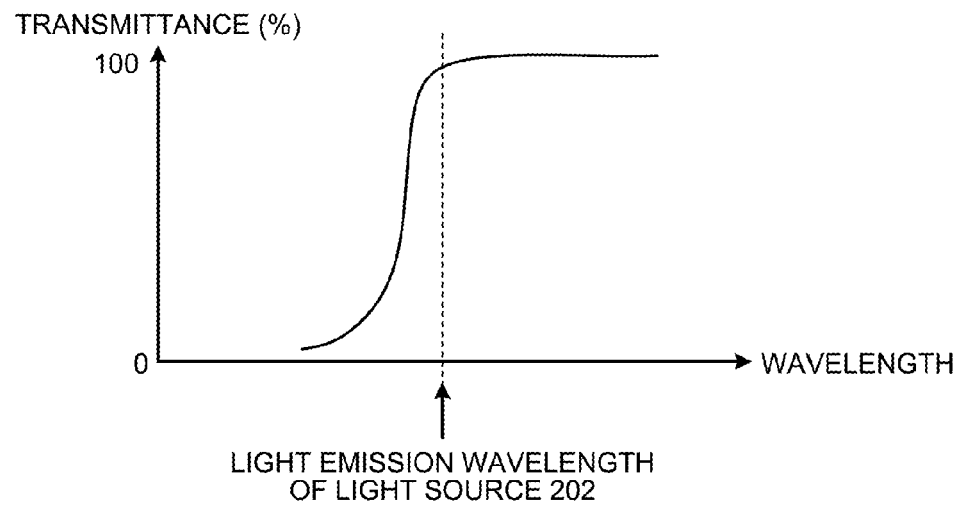
FIG. 6 is a graph illustrating filter characteristic of a cut filter applicable to the raindrop detection captured image data.
Figure 7:
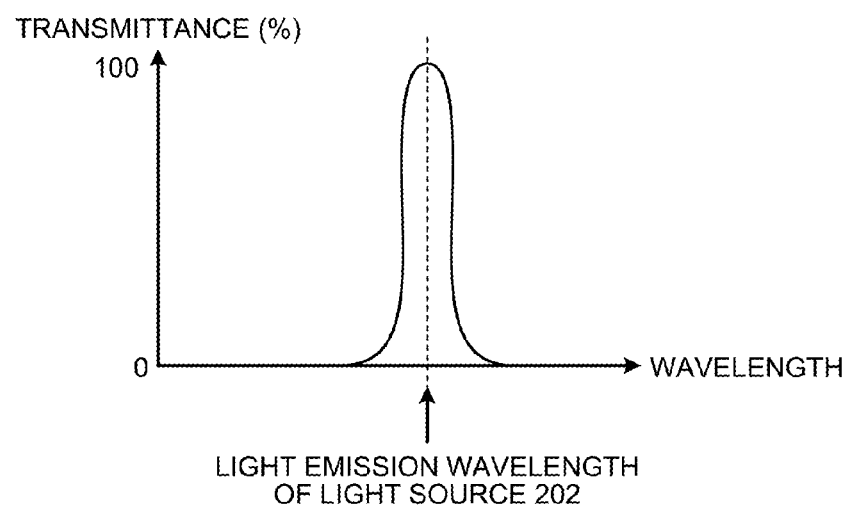
FIG. 7 is a graph illustrating filter characteristic of a bandpass filter applicable to the raindrop detection captured image data.

Accordingly, the present embodiment is configured that, for example, as illustrated in FIG. 6, the light emitted by the light source 202 is received by the image sensor 206 via a cut filter for cutting light of a wavelength shorter than the wavelength of the light emitted by the light source 202 or a bandpass filter, as illustrated in FIG. 7, of which peak of transmittance matches the wavelength of the light emitted by the light source 202. Accordingly, it is possible to receive light by removing light other than the wavelength of the light emitted by the light source 202, and therefore, the amount of light emitted by the light source 202 and received by the image sensor 206 is relatively larger than the ambient light. As a result, even when the light source 202 does not emit a large amount of light, the light emitted by the light source 202 can be distinguished from the ambient light.

However, in the present embodiment, not only the raindrop 203 on the windshield 105 is detected from the captured image data, but also a preceding vehicle and an oncoming vehicle are detected, and a white line is also detected. Therefore, when, the wavelength band other than the infrared wavelength light emitted by the light source 202 is removed in the entire captured image, the image sensor 206 is unable to receive light in the wavelength band required for detection of a preceding vehicle and an oncoming vehicle and detection of a white line, and problems would be caused in detection thereof. Accordingly, in the present embodiment, the image region of the captured image data is divided into a raindrop detection image region for detecting the raindrop 203 on the windshield 105 and a vehicle detection image region for detecting a preceding vehicle and an oncoming vehicle and detecting a white line, and only in a portion corresponding to the raindrop detection image region, a filter for removing the wavelength band other than the infrared wavelength light emitted by the light source 202 (which may be hereinafter referred to as "raindrop detection filter") is provided as a portion of the optical filter 205. More specifically, the raindrop detection image region is a region of the captured image data obtained by capturing an image in a region of image-capturing region where the raindrop detection filter exists (which may be hereinafter referred to as "raindrop detection filter existing region"). On the other hand, the vehicle detection image region is a region of captured image data obtained by capturing an image in a region of the image-capturing region where the raindrop detection filter does not exist (which may be hereinafter referred to as "raindrop detection filter non-existing region").

In this case, the raindrop detection filter non-existing region corresponds to the first region, and the raindrop detection filter existing region corresponds to the second region.

Figure 8A:
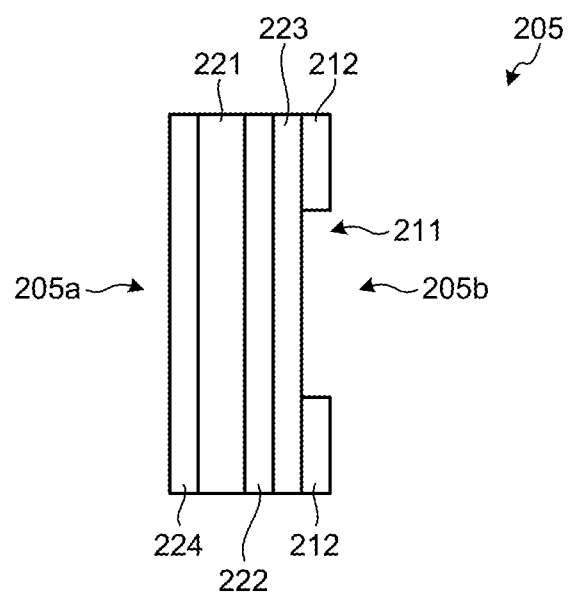
FIG. 8A is a side view illustrating an optical filter.

FIG. 8A is a side view illustrating the optical filter 205. As illustrated in FIG. 8A, in the optical filter 205 according to the present embodiment, a spectroscopic filter layer 224 for passing light corresponding to infrared light and visible light is formed on a surface of a substrate 221 at the side of the image-capturing lens 204 (denoted by "205a" in FIG. 8A). A polarization filter layer 222, a SOG (Spin On Glass) layer 223, and an infrared light transmitting filter 212 which is a raindrop detection filter are formed in order on a surface of the substrate 221 at the side of the image sensor 206 (denoted by "205b" in FIG. 8A).

As described above, the filter layers are formed on the both surfaces of the substrate 221 of the optical filter 205, so that this can prevent warpage of the optical filter 205. When a multi-layer film is formed on a surface at only one side of the substrate 221, stress is given to the substrate 221, and the substrate 221 is warped. However, the multi-layer films are formed on both surfaces of the substrate 221 as illustrated in FIG. 8A, the effect of stress is cancelled, and this can prevent warpage.

In this case, the substrate 221 may be constituted by a material transparent to visible light range, e.g., glass, sapphire, and crystal. In the present embodiment, glass is used as a material of the substrate 221, and in particular, quartz (refractive index 1.46) and Tempax glass (refractive index 1.51) which are inexpensive and durable are used as a material of the substrate 221.

The spectroscopic filter layer 224 formed on the surface of the substrate 221 at the side of the optical filter 205a is a filter for transmitting both of a so-called visible light region having a wavelength range of 400 nm to 670 nm and an infrared light region having a wavelength range of 940 to 970 nm. The visible light region is used to detect vehicle ambient information, and the infrared light region is used to detect raindrop. The spectroscopic filter layer 224 does not transmit light in a range of a wavelength of 700 to 940 nm (the transmittance is preferably equal to or less than 5%). This is because when this wavelength range is retrieved, the overall color of the obtained image data becomes red, and it may be difficult to extract a portion representing red color of tail lamps. Accordingly, when a filter having characteristic of cutting the infrared light is formed, lights in other colors which cause disturbance can be removed, and therefore, for example, detection accuracy of tail lamps can be improved.

The polarization filter layer 222 formed on the surface at the side of the optical filter 205*b* is a filter for cutting S polarization component and transmitting only P polarization component. With this polarization filter layer 222, cause of disturbance and unnecessary reflection light (reflected light) can be cut.

In the present embodiment, the polarization filter layer 222 is constituted by a wire grid polarizer. The wire grid is made by arranging conductive lines made of metal such as aluminum with a particular pitch in a reticular pattern, and when the pitch is a pitch (for example, one half or less) which is much smaller than the incident light (for example, wavelength of visible light, i.e., 400 nm to 800 nm), almost all the light having an electrical field vector component oscillating in parallel to the conductive lines is reflected, and almost all the light having an electrical field vector component perpendicular to the conductive lines is transmitted, so that it is used as a polarizer generating a single polarization.

In the wire grid polarizer, when the size of cross sectional area of the metal wire increases, the extinction ratio increases, and further, the transmittance decreases in a metal wire having a predetermined or wider width with respect to the cycle width. When the cross sectional shape of the metal wire perpendicular to the longitudinal direction is a tapered shape, the transmittance and the wavelength depressiveness of the polarization degree is low in a wide band, which exhibits high extinction ratio characteristic. In a cross sectional structure (not illustrated) of the wire grid, incident light having a polarization direction in the groove direction is shielded, and incident light having a polarization direction in a direction perpendicular to the groove direction is transmitted.

In the present embodiment, since the wire grid structure is used as the polarizer for the polarization filter layer 222, there are the following advantages. More specifically, the wire grid structure is made by forming a sub-wavelength protrusion/recess structure of the wire grid by performing a well-known semiconductor process, i.e., evaporation of aluminum thin film, thereafter performing patterning process, and using a method such as meta etching. Accordingly, the direction of the polarizer can be adjusted by a size corresponding to a pixel size of the image-capturing device (in several microns), and the transmitting polarization axis can be selected in units of pixels as those of the present embodiment. As described above, the wire grid structure is made of metal such as aluminum, and has superior heat resistance, which is suitable for mounting to vehicles.

In the SOG layer 223 according to the present embodiment, the substrate transparent to the light of the used band and the protruding portions of the wire grid extending straightly on the substrate are arranged with a pitch which is less than the wavelength of the light of the used band. Between the aluminum protruding portions, filling portions are formed, wherein the filling portions are filled with an inorganic material of which refractive index is less than or the same as that of the substrate 221. These filling portions are formed to also cover the protruding portions of the wire grid structure.

The material forming the SOG layer 223 is preferably a material of which refractive index is low and close to one, which is the refractive index of air, as much as possible, in order to prevent degradation of the polarization characteristic of the polarizer of the polarization filter layer 222. For example, the material forming the SOG layer 223 is preferably porous ceramics material which is formed by dispersing very small air holes in the ceramics, such as porous silica ($SiO_2$), porous magnesium fluoride (MgF), and porous alumina ($Al_2O_3$). The degree of low refractive index thereof is determined by the magnitude and the number of air holes in the ceramics (porosity). Among them, in particular, when the main component of the substrate 221 is silica crystal or glass, porous silica (n=1.22 to 1.26) is preferable since it has a lower refractive index than that of the substrate 221.

The method for forming the SOG layer 223 is inorganic coating film (SOG: Spin On Glass) generating method. More specifically, it is formed by the following process. A solvent obtained by dissolving silanol [$Si(OH)_4$] in alcohol is spin-coated onto the substrate, and thereafter the solvent component is evaporated by thermal treatment, whereby the silanol itself is reacted by dehydration polymerization reaction.

The SOG layer 223 is used, and the polarization filter layer 222 has the wire grid structure of the sub-wavelength size, and therefore, it is weaker in terms of rigidity as compared with the infrared light transmitting filter 212 formed on the SOG layer 223. In particular, the optical filter 205 is desired to be arranged so as to be in close contact with the image sensor 206, and therefore, when it is handled, the image-capturing device surface of the image sensor 206 and the optical filter 205 may come into contact with each other, but the polarization filter layer 222 which is weak in terms of rigidity is protected by the SOG layer 223, and therefore, the optical filter 205 can be implemented without damaging the wire grid structure. It should be noted that the spectroscopic filter layer 224 can also be protected by the SOG layer 223.

By providing the SOG layer 223, foreign objects can be prevented from entering into the wire grid portion. In general, the height of the protruding portion of the wire grid is constituted by a height equal to or less than half of the used wavelength. On the other hand, the spectroscopic filter is with a height several times the used wavelength to the same height as the used wavelength, wherein the thicker the spectroscopic filter is, the acuter the transmittance characteristic can be in the shielding wavelength. Further, the thicker of the thickness of the SOG layer 223 is, the more difficult it becomes to ensure the flatness of the upper surface thereof, and it is not appropriate to make it thick because the uniformity in the filling region is lost. In the present embodiment, the polarization filter layer 222 is covered with the SOG layer 223, and thereafter the infrared light transmitting filter 212 is formed, and therefore, the SOG layer 223 can be stably formed. The infrared light transmitting filter 212 formed on the upper surface of the SOG layer 223 can also be formed so as to make the characteristic thereof optimum.

Figure 8B:
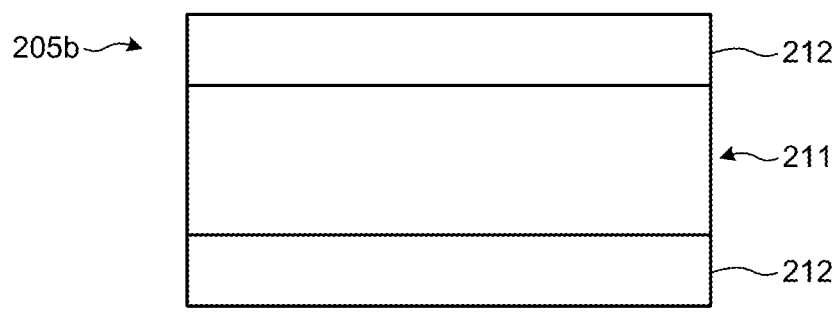
FIG. 8B is a front view illustrating the optical filter of the image-capturing device at the side of an image sensor.
Figure 9:
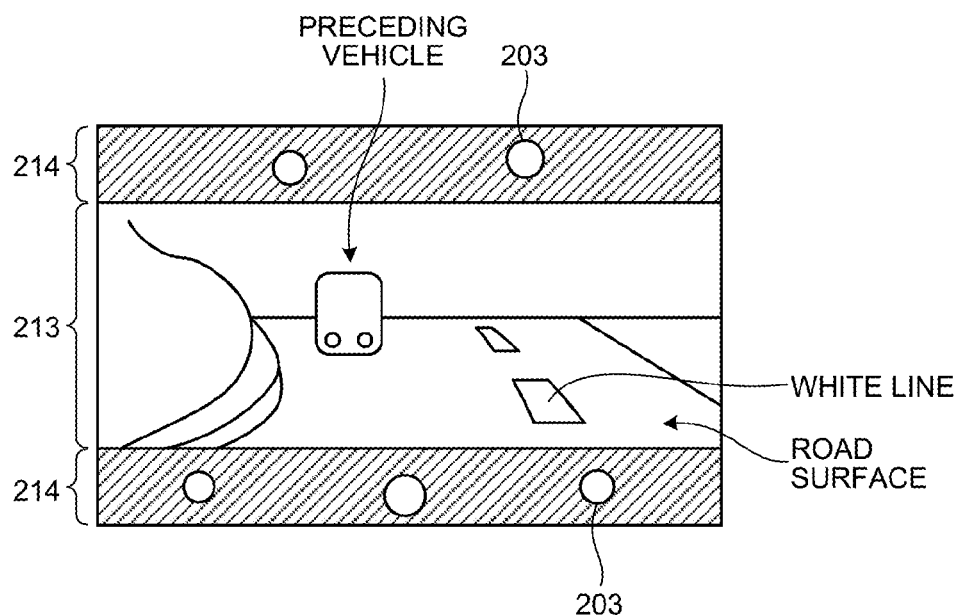
FIG. 9 is an explanatory diagram illustrating an image example of captured image data of the image-capturing device according to the first embodiment.

FIG. 8B is a front view of the optical filter 205 at the side of the image sensor 206. FIG. 9 is an explanatory diagram illustrating an image example of captured image data. As illustrated in FIG. 8B, the region is divided into a region 211 (infrared light cut filter region) arranged at a portion corresponding to a captured image central portion which is a vehicle detection image region 213 (a portion corresponding to 2/4 of the height of the image-capturing region) and infrared light transmitting filters 212 arranged at portions corresponding to the upper portion of the captured image which is a raindrop detection image region 214 (a portion corresponding to ¼ of the height of the image-capturing region) and the lower portion of the captured image (a portion corresponding to ¼ of the height of the image-capturing region). The infrared light transmitting filter 212 uses a cut filter as illustrated in FIG. 6 and a bandpass filter as illustrated in FIG. 7.

Images of the head lamps of an oncoming vehicle, the tail lamps of a preceding vehicle, and a white line are often located mainly in the upper portion of the captured image, and usually, an image of a road surface immediately in front of the driver's vehicle exists in the lower portion of the captured image. Therefore, information required to identify the head lamps of an oncoming vehicle, the tail lamps of a preceding vehicle, and a white line is concentrated in the upper portion of the captured image, and in the identification process, the information about the lower portion of the captured image is not so important. Therefore, in order to detect not only an oncoming vehicle, a preceding vehicle, or a white line but also raindrop from a single piece of captured image data, it is preferable to define, as illustrated in FIG. 9, the lower portion and the upper portion of the captured image as the raindrop detection image regions 214, define the central portion of the remaining captured image as the vehicle detection image region 213, and arrange the infrared light transmitting filters 212 corresponding thereto.

When the image-capturing direction of the image-capturing device 200 is inclined downward, the hood of the driver's vehicle may appear in the lower portion of the image-capturing region. In this case, sunlight reflected by the hood of the driver's vehicle and the tail lamps of a preceding vehicle become ambient light, and this is included in the captured image data, and as a result, this may cause false identification of the head lamps of an oncoming vehicle, the tail lamps of a preceding vehicle, and a white line. Even in such case, the present embodiment is configured to remove the ambient light such as the sunlight reflected by the hood and the tail lamps of the preceding vehicle because the cut filter as illustrated in FIG. 6 and the bandpass filter as illustrated in FIG. 7 are arranged in the portion corresponding to the lower portion of the captured image. Therefore, this improves the precision in identifying the head lamps of an oncoming vehicle, the tail lamps of a preceding vehicle, and a white line.

In the present embodiment, due to the characteristic of the image-capturing lens 204, the scene in the image-capturing region is upside-down to the image on the image sensor 206. Therefore, when the lower portion of the captured image is defined as the raindrop detection image region 214, the upper portion of the optical filter 205 at the side of the image sensor 206 is constituted by the cut filter as illustrated in FIG. 6 and the bandpass filter as illustrated in FIG. 7.

In this case, when a preceding vehicle is detected, the preceding vehicle is detected by identifying the tail lamps in the captured image, but the amount of light emitted by the tail lamps is less than the amount of light emitted by the head lamps of an oncoming vehicle, and there are many ambient lights such as streetlamps, and this makes it difficult to detect the tail lamps only from mere brightness data with a high degree of accuracy. Therefore, spectroscopic information is used to identify the tail lamps, and it is necessary to identify the tail lamps on the basis of the amount of received light in red color. Accordingly, in the present embodiment, as explained below, a red filter or a cyan filter (filter transmitting only a wavelength band of the color of the tail lamps) suitable for the color of the tail lamps is provided at the side of the image-capturing lens 204 in the optical filter 205, so that the amount of received light in red color can be detected.

However, each light-receiving element constituting the image sensor 206 according to the present embodiment has sensitivity for detecting light of infrared wavelength band, and therefore, when the image sensor 206 receives light including infrared wavelength band, overall color of the obtained captured image is reddish. As a result, it may be difficult to identify an image portion in red corresponding to the tail lamps. Accordingly, in the present embodiment, at the side of the image sensor 206 in the optical filter 205, a portion corresponding to the vehicle detection image region 213 is made as the infrared light cut filter region 211. This removes the infrared wavelength band from the captured image data portion used for identifying the tail lamps, so that the precision in identifying the tail lamps is improved.

Figure 10:
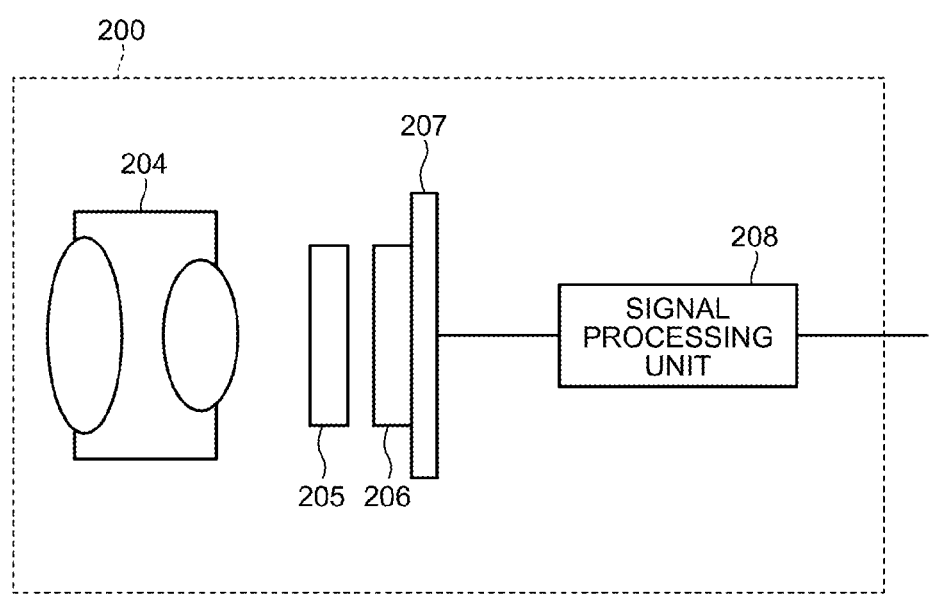
FIG. 10 is an explanatory diagram illustrating the details of the image-capturing device according to the first embodiment.

FIG. 10 is an explanatory diagram illustrating the details of the image-capturing device 200 according to the present embodiment. This image-capturing device 200 mainly includes an image-capturing lens 204, an optical filter 205, a sensor substrate 207 including an image sensor 206 having a pixel array arranged in a two-dimensional manner, and a signal processing unit 208 generating and outputting captured image data obtained by converting analog electric signals, which are output from the sensor substrate 207 (the amount of light received by each light-receiving element on the image sensor 206) into a digital electric signal. The light from the image-capturing region including a subject (detection target object) passes the image-capturing lens 204 and the optical filter 205, and is converted into an electric signal in accordance with the light intensity thereof by the image sensor 206. When the signal processing unit 208 receives the electric signal (analog signal) which is output from the image sensor 206, the signal processing unit 208 outputs, from the electric signal, a digital signal indicating luminance (brightness) of each pixel on the image sensor 206 as captured image data and a horizontal/vertical synchronization signal of the image to later-stage units.

Figure 11A:
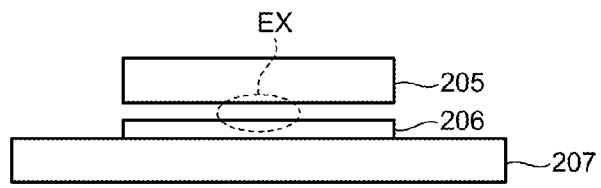
FIG. 11A is a schematic view illustrating the optical filter and the image sensor of the image-capturing device according to the first embodiment, when the optical filter and the image sensor are seen in a direction perpendicular to the light transmission direction.
Figure 11B:
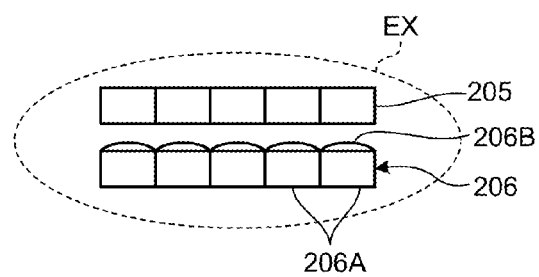
FIG. 11B is an enlarged view of region EX of FIG. 11A.

FIG. 11A is a schematic view illustrating the optical filter 205 and the image sensor 206, when the optical filter 205 and the image sensor 206 are seen in a direction perpendicular to the light transmission direction; FIG. 11B is an enlarged view of region EX of FIG. 11A. The image sensor 206 is a light-receiving element using a CCD (Charge Coupled Device), a CMOS (Complementary Metal Oxide Semiconductor), and the like, and a photodiode 206A is used for each pixel. The photodiodes 206A are arranged for the respective pixels in an array in a two-dimensional manner, and in order to improve the light condensing efficiency of the photodiode 206A, a micro lens 206B is provided at the incident side of each photodiode 206A. This image sensor 206 is joined with a PWB (Printed Wiring Board) using a method such as wire bonding, and thus the sensor substrate 207 is formed.

The optical filter 205 and the image sensor 206 may be joined using ultraviolet (UV) adhesive agent, or the optical filter 205 and the image sensor 206 may be joined such that four-side regions outside of the effective pixels are adhered with ultraviolet ray or bonded with thermal compression while the regions outside of the effective pixel range used for image-capturing are supported by spacers and the like. By joining the optical filter 205 and the image sensor 206 in a close contact manner, the border between the raindrop detection region and the vehicle detection region becomes clear, and this improves the precision in determining whether there is raindrop or not.

If a raindrop detection region is provided only at one of the upper portion of the screen and the lower portion of the screen in the image region as illustrated in FIG. 9, it is difficult to adhere the optical filter 205 and the image sensor 206 in parallel, and the optical filter 205 and the image sensor 206 would be adhered in an inclined manner. When the optical filter 205 and the image sensor 206 are adhered in an inclined manner, the lengths of the optical paths would be changed in the upper portion of the region and in the lower portion of the region, and when vehicle ambient information, e.g., white line, is detected, this may cause degradation of recognition accuracy such as false reading of a white line coordinate. For this reason, in the present embodiment, as illustrated in FIG. 9, the raindrop detection regions are arranged in the upper portion and the lower portion of the captured image, and the infrared light transmitting filters 212 are arranged to correspond to the raindrop detection regions, so that the optical filter 205 and the image sensor 206 can be easily adhered to each other in parallel, and as a result, the precision of raindrop detection can be improved.

According to the present embodiment, foreign object detection can be performed to control the wiper 107 and a washer (not illustrated). In this case, a foreign object means a raindrop, but may also include not only a raindrop but also a bird dropping or a splash on a road surface caused by an adjacent vehicle.

Figure 12:
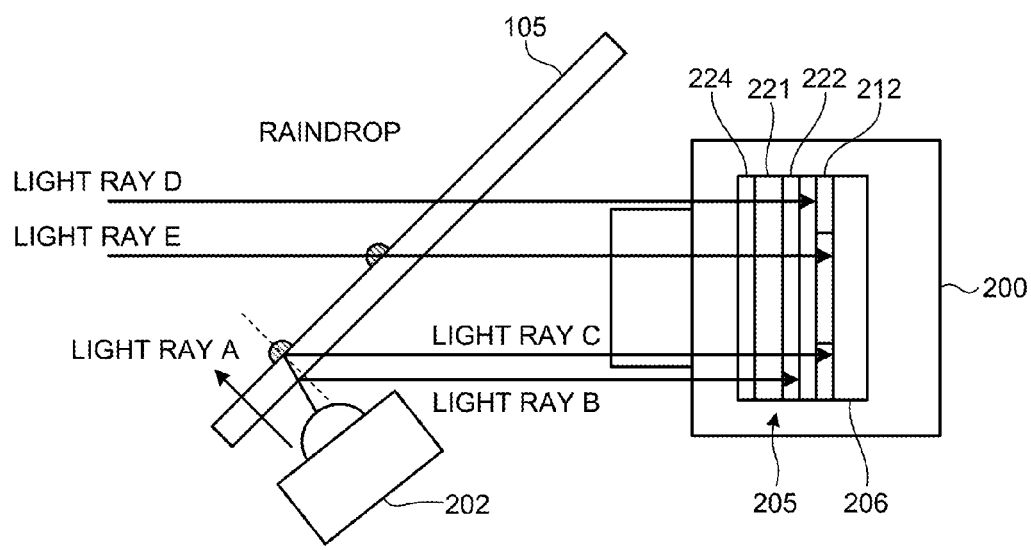
FIG. 12 is a figure for explaining foreign object detection.

FIG. 12 is a figure for explaining foreign object detection. The light source 202 is arranged so that regular reflection light of the external surface of the windshield substantially matches the optical axis of the image-capturing lens. The light ray received by the image-capturing device 200 will be explained using symbols, i.e., light rays A to E, in the figure.

Light ray A: the light ray A which is emitted from the light source 202 and passes the windshield leaks to the outside as it is when there is no raindrop attached to the outside with respect to the image-capturing device 200 of the windshield 105. The light source 202 is selected from a light source having the wavelength/the amount of light which are safe to the eyes, and as illustrated in FIG. 12, the light source 202 outputs light to the upper side to ensure higher degree of safety.

Light ray B: a portion of the output light from the light source 202 is reflected by the surface of the windshield 105 when it enters the windshield 105. In general, the polarization component thereof is known to be the S polarization component. Such light is originally unnecessary for raindrop detection, and may cause false detection, but in the present embodiment, the S polarization component is cut by the polarization filter layer 222 of the optical filter 205, so that the unnecessary light can be removed.

Light ray C: in the output light from the light source 202, a component of the light ray C that passes through the windshield 105 without being reflected by the surface at the inner side of the windshield 105 has much P polarization component than the S polarization component. When raindrop is attached to the outside of the windshield 105, this light entering the windshield 105 is reflected multiple times in the raindrop, and the light passes through the windshield again toward the side of the image-capturing device 200, and reaches the optical filter 205 of the image-capturing device. Then, it passes through the spectroscopic filter layer 224, and because the groove direction of the wire grid structure is formed to pass the P polarization component in the subsequent polarization filter layer 222, the light also passes through this. At this occasion, in the raindrop detection region, the infrared light transmitting filter 212 is formed in accordance with the wavelength of the light source 202, but the light ray C passes through the infrared light transmitting filter 212, and reaches the image sensor 206, so that raindrop attached to the surface of the windshield 105 can be recognized.

Light ray D: most of the light ray D of the light reaching the image-capturing device 200 which is not from the light source 202 but is incident from the outside of the windshield 105 and that reaches the raindrop detection region is cut by the infrared light transmitting filter. As described above, the raindrop detection region is configured to also cut the ambient light of the outside of the windshield 105.

Light ray E: in the light ray E passing through a region other than the raindrop detection region, i.e., a region where there is not infrared light transmitting filter 212, only visible light and infrared light are transmitted, and it is made into only the P polarization component, so that the light ray E reaches the image sensor 206 without any unnecessary light, and is detected as a signal for various kinds of applications.

The incident angle of the light source 202 into the windshield 105 is set so as to allow image-capturing of reflection light reflected by any one of the surfaces of the interfaces between raindrop and air. As illustrated in FIG. 12, the layout in which the reflection light reflected by raindrop is of the highest intensity is a case where the light source 202 is arranged at a position substantially opposite to the optical axis of the image-capturing device 200 with respect to the normal line to the surface of the windshield 105 and the light source 202 is arranged on almost the same optical axis as the optical axis of the image-capturing device 200. When the normal line to the windshield 105 substantially matches the optical axis of the light source 202, the reflection light reflected by raindrop is of the lowest intensity.

It should be noted that the light source 202 can be arranged to emit light onto only the region of the infrared light transmitting filter 212. Accordingly, it is possible to avoid noise component from the vehicle detection region. Further, a plurality of light sources 202 may be provided. In this case, the polarizer pattern of each region of the polarization filter layer 222 is set so that one of the multiple light sources 202 of which amount of light incident upon the polarizer pattern transmits only the polarization component in parallel to the surface formed by two optical axes including an optical axis of the light emitted toward the windshield 105 and the optical axis of the image-capturing lens.

The light emission method of the light source 202 may be continuous light emission (which may also be referred to as CW light emission) or may be pulse light emission with particular timing. By synchronizing the timing of light emission and the timing of image-capturing, the effect caused by the ambient light can be reduced. When a plurality of light sources 202 are provided, a plurality of light sources 202 may emit light at a time, or may emit light successively in order. When the plurality of light sources 202 emit light successively in order, the effect caused by the ambient light can be reduced by synchronizing the timing of light emission and the timing of image-capturing.

Figure 13:
FIG. 13 is a figure for illustrating an experimental result when raindrops are attached.
Figure 14:
FIG. 14 is a figure for illustrating an experimental result when no raindrop is attached.

Now, a result of experiment taken by the inventor is shown in FIGS. 13 and 14. The lower portion and the upper portion of the image region are raindrop detection regions. FIG. 13 is a figure illustrating a result of experiment when raindrops are attached. FIG. 14 is a figure illustrating a result of experiment when no raindrop is attached.

A region DA in FIG. 13 is the raindrop detection region, and when raindrops are attached to this region, the LED light is incident thereupon from the light source 202, and when no raindrop is attached, the LED light is not detected. When raindrops are attached, the raindrops are recognized, which is indicated as "Rain detected" as illustrated in FIG. 13. When no raindrop is attached, the raindrops are not recognized, which is indicated as "Rain not detected" as illustrated in FIG. 14. This recognition processing can be easily performed by adjusting a threshold value of the amount of received LED light. It should be noted that it is not necessary to uniquely determine the threshold value, and an optimum value may be configured to be calculated on the basis of exposure adjustment information about the vehicle detection region of the image-capturing device 200.

Figure 15:
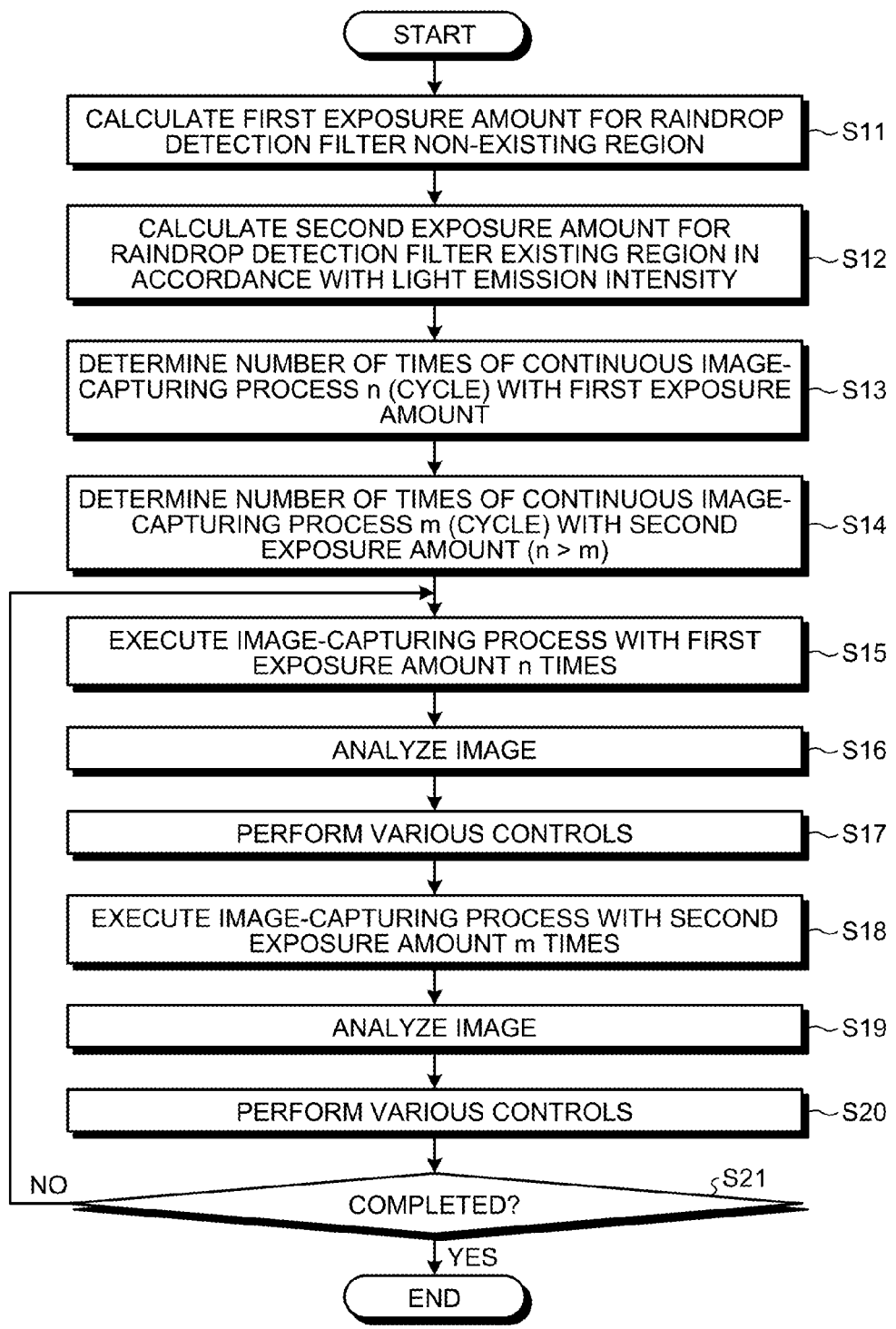
FIG. 15 is a flowchart illustrating procedure of exposure control processing according to the first embodiment.

Subsequently, the exposure control processing according to the present embodiment will be explained. FIG. 15 is a flowchart illustrating the procedure of exposure control processing according to the first embodiment. First, the exposure control unit 109 determines a first exposure amount for capturing an image of a raindrop detection filter non-existing region (corresponding to the vehicle detection image region 213) which is the region 211 where there is no infrared light transmitting filter 212 (step S11).

The first exposure amount is the amount of exposure suitable for the image-capturing process of the raindrop detection filter non-existing region (vehicle detection image region 213).

In this case, the exposure control unit 109 determines the first exposure amount, in accordance with the amount of light of the raindrop detection filter non-existing region. In other words, the first exposure amount is determined by causing the measurement range of the automatic exposure control (AE: Auto Exposure) to be set as a raindrop detection filter non-existing region. More specifically, the amount of exposure is determined according to an exposure time.

That is, when an image at a distance is to be captured, the automatic exposure adjustment is performed while detecting the portion in the raindrop detection filter non-existing region. In the region 211 where there is no infrared light transmitting filter 212, the amount of light is changed greatly in periphery. The illumination intensity around the vehicle taken by the image-capturing device 200 changes from several tens of thousands of luxes at noon to one lux or less at night. For this reason, the exposure time needs to be adjusted in accordance with a scene to be captured, and for this issue, publicly-known automatic exposure control is performed. In the present embodiment, the subject is around the road surface, and therefore, the exposure control is preferably performed on the basis of the image in the road surface region.

Subsequently, the exposure control unit 109 determines the second exposure amount for capturing an image of a raindrop detection filter existing region (corresponding to the raindrop detection image region 214) which is the region where there is the infrared light transmitting filter 212 (step S12).

The second exposure amount is the amount of exposure suitable for the image-capturing process of the raindrop detection filter existing region (raindrop detection image region 214). The raindrop detection filter existing region is set to retrieve only the reflection light of the light source 202 that is reflected by a foreign object, and therefore, the amount of light does not change greatly due to ambient environment. Therefore, it is possible to capture an image with a fixed exposure time regardless of circumstances of outside light.

Figure 16:
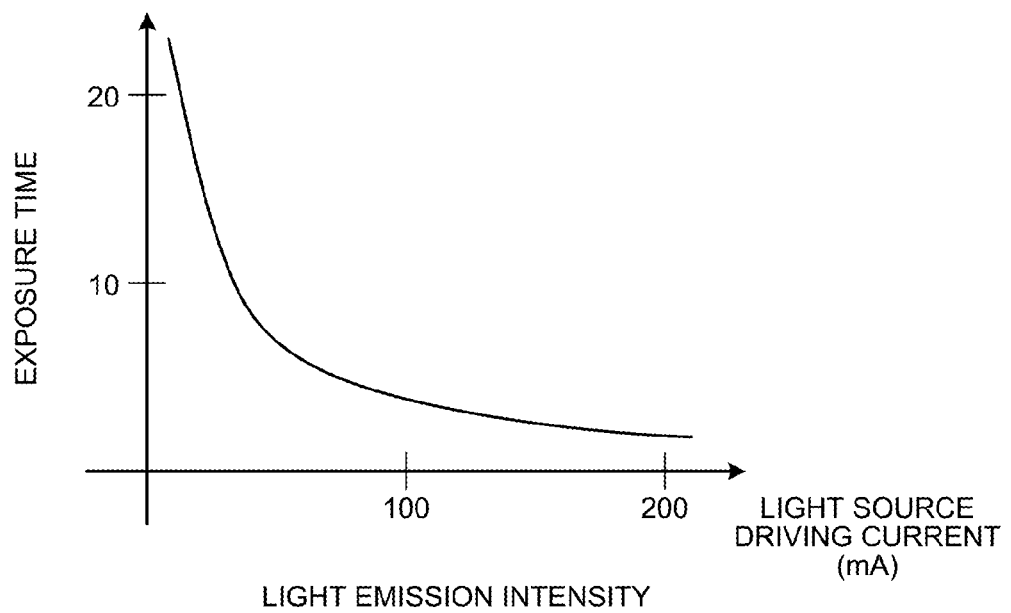
FIG. 16 is a relationship diagram illustrating the amount of exposure and light emission intensity of a light source.

FIG. 16 is a relationship diagram illustrating the amount of exposure and light emission intensity of the light source 202. As illustrated in FIG. 16, as the light emission intensity increases, the amount of exposure decreases (the exposure time decreases). In the present embodiment, the exposure control unit 109 changes and determines the second exposure amount in accordance with the relationship of FIG. 16 from a driving electric current corresponding to the light emission intensity of the light source.

As described above, the image-capturing process with the first exposure amount suitable for the raindrop detection filter non-existing region results in image-capturing process in the raindrop detection filter non-existing region. The image-capturing process with the second exposure amount suitable for the raindrop detection filter existing region results in image-capturing process in the raindrop detection filter existing region. Therefore, in the explanation below, the image-capturing process with the first exposure amount suitable for the raindrop detection filter non-existing region may be referred to as "image-capturing process in the raindrop detection filter non-existing region", and the image-capturing process with the second exposure amount suitable for the raindrop detection filter existing region may be referred to as "image-capturing process in the raindrop detection filter existing region".

Subsequently, the exposure control unit 109 determines the number of times of continuous image-capturing process n with the first exposure amount (step S13). The exposure control unit 109 also determines the number of times of continuous image-capturing process m with the second exposure amount (step S14). In this case, the number of times of continuous image-capturing process m with the second exposure amount is a number less than the number of times of continuous image-capturing process n with the first exposure amount. For example, n=30, m=1.

Then, the image-capturing device 200 continuously executes the image-capturing process with the first exposure amount n times (step S15). Then, the image analysis unit 102 analyzes the captured image (step S16), and performs various kinds of controls with the head lamp control unit 103, the vehicle cruise control unit 108, and the like (step S17).

Subsequently, the image-capturing device 200 executes the image-capturing process with the second exposure amount m times (step S18). Then, the image analysis unit 102 analyzes the captured image (step S19), and performs various kinds of controls with the wiper control unit 106 and the like (step S20).

Then, until a predetermined termination instruction (a termination command given by a user and the like) is received, processing in steps S15 to S20 is repeatedly executed (No in step S21).

For example, when n is 30 and m is 1, the image-capturing device 200 continuously performs image-capturing process suitable for the raindrop detection filter non-existing region with the first exposure amount 30 times, and thereafter performs image-capturing process suitable for the raindrop detection filter existing region with the second exposure amount one time. Thereafter, the image-capturing device 200 switches so as to continuously perform the image-capturing process suitable for the raindrop detection filter non-existing region with the first exposure amount 30 times.

The image in the raindrop detection filter non-existing region is used for the recognition processing such as white line detection and vehicle detection with the image analysis unit 102. This recognition processing also uses information about input image frames, and accordingly, frames captured with a determined time interval or in accordance with a rule need to be input into the image analysis unit 102.

In the raindrop detection for determining whether to drive the wiper or not, the situation may not change in a short period of time, as compared with, e.g., lane deviation detection and preceding vehicle distance detection, and moreover, the raindrop detection for determining whether to drive the wiper or not has a low level of priority in terms of safety.

For this reason, the number of times of continuous image-capturing process m for the raindrop detection filter existing region is determined as being less than the number of times of continuous image-capturing process n for the raindrop detection filter non-existing region, so that the captured images in the raindrop detection filter existing region are inserted into captured images in the raindrop detection filter non-existing region with a regular interval.

As described above, in the present embodiment, the image-capturing device 200 performs image-capturing process using both of captured images of vehicle detection and captured images of raindrop detection, but the image analysis is performed by switching the continuous image-capturing process of the captured images in the raindrop detection filter non-existing region and the captured images in the raindrop detection filter existing region, and therefore, the power consumption can be reduced, and the safety can be further improved.

Second Embodiment

A vehicle-mounted device control system according to a second embodiment reduces an insertion cycle of captured images in the raindrop detection filter existing region when raindrops are detected. When raindrops are detected, the ratio of the number of times of continuous image-capturing process in the raindrop detection filter existing region increases with respect to the number of times of continuous image-capturing process in the raindrop detection filter non-existing region. More specifically, when raindrops are detected, the image-capturing device 200 reduces the number of times of continuous image-capturing process n in the raindrop detection filter non-existing region, and does not change the number of times of continuous image-capturing process m in the raindrop detection filter existing region, or does not change the number of times of continuous image-capturing process n in the raindrop detection filter non-existing region, and increases the number of times of continuous image-capturing process m in the raindrop detection filter existing region.

Both of the schematic configuration of a vehicle-mounted device control system according to the present embodiment and the schematic configurations of an image-capturing unit 101 and an image-capturing device 200 are the same as those of the first embodiment.

Heavy rain does not fall very suddenly, and therefore, when raindrops are not detected, the frequency of frames for capturing images in the raindrop detection filter existing region may be reduced. However, once raindrops are detected, it is preferable to finely watch the change of rainfall, and therefore, in such case, the image-capturing device 200 increases the frequency of frames for capturing images in the raindrop detection filter existing region.

For example, suppose a case where the following switching is usual: image-capturing process in raindrop detection filter non-existing region is performed 120 times, then image-capturing process in the raindrop detection filter existing region is performed one time, then image-capturing process in the raindrop detection filter non-existing region is performed 120 times, then image-capturing process in the raindrop detection filter existing region is performed one time, then image-capturing process in the raindrop detection filter non-existing region is performed 120 times, and so on. In this case, once raindrop is detected, the frequency is changed as follows to finely watch the images.

The image-capturing process in the raindrop detection filter non-existing region is performed 30 times, then the image-capturing process in the raindrop detection filter existing region is performed one time, then the image-capturing process in the raindrop detection filter non-existing region is performed 30 times, then the image-capturing process in the raindrop detection filter existing region is performed one time, then the image-capturing process in the raindrop detection filter non-existing region is performed 30 times, and so on.

In the present embodiment, when raindrops are detected, the wiper control unit 106 drives the wiper at a speed according to the amount of raindrops. Then, the image-capturing device 200 captures an image in the raindrop detection filter existing region, i.e., captures an image with the second exposure amount, in synchronization with the driving cycle of the wiper with the wiper control unit 106.

More specifically, after the wiper is driven, the raindrops are wiped, and raindrops are no longer detected. Therefore, in the raindrop detection filter existing region, an image is captured at a time when the wiper finishes wiping the raindrops. This eliminates the necessity of increasing unnecessary raindrop detection captured images, and the number of frames of the captures images for vehicle detection of white line detection can be increased. When no raindrop is detected for a certain period of time, the frequency of image-capturing process in the raindrop detection filter existing region is preferably returned back to a normal frequency.

Figure 17:
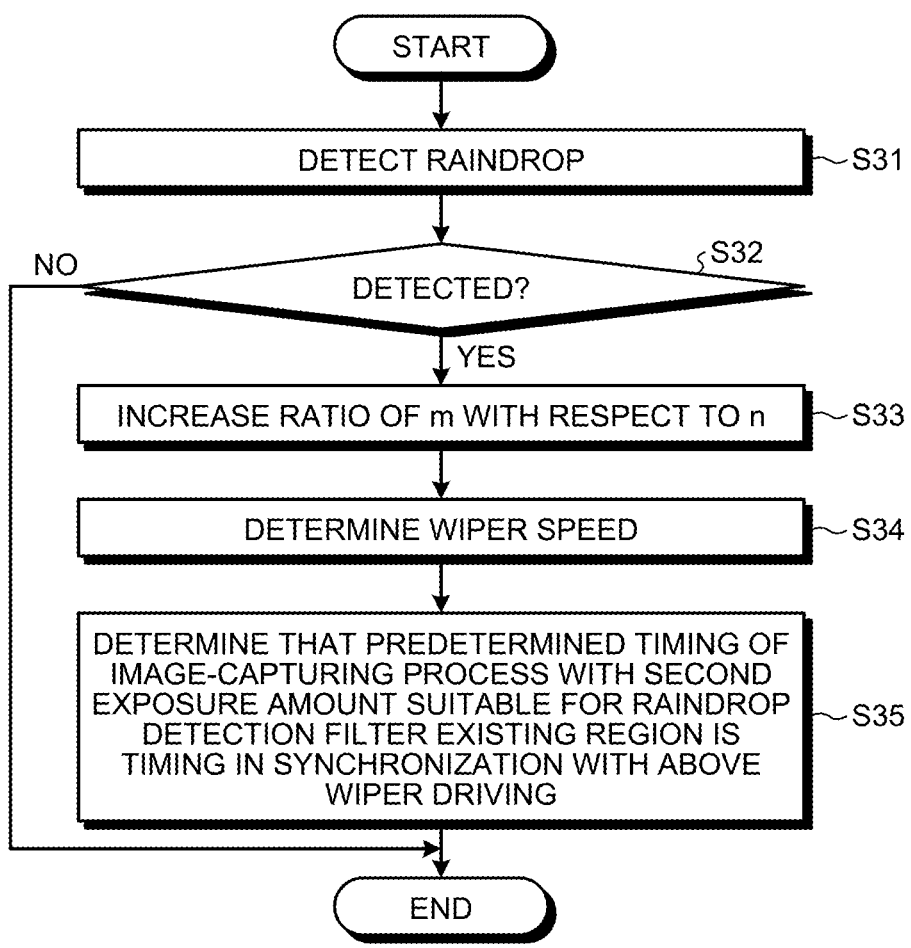
FIG. 17 is a flowchart illustrating procedure of control processing according to a second embodiment.

FIG. 17 is a flowchart illustrating procedure of the control processing according to the second embodiment. The image analysis unit 102 detects raindrop from the captured image in the raindrop detection filter existing region (step S31). Then, when raindrop is detected (Yes in step S32), the image-capturing device 200 increases the ratio of the number of times of continuous image-capturing process m in the raindrop detection filter existing region with respect to the number of times of continuous image-capturing process n in the raindrop detection filter non-existing region (step S33).

Subsequently, the wiper control unit 106 determines the driving speed of the wiper in accordance with the amount of raindrops (step S34), and drives the wiper on the basis of the driving speed.

Subsequently, the image-capturing device 200 determines that the timing of the image-capturing process with the second exposure amount suitable for the raindrop detection filter existing region is timing in synchronization with the above wiper driving (step S35). Accordingly, in the raindrop detection filter existing region, an image is captured when the wiper finishes wiping raindrops.

In the present embodiment, as described above, when raindrops are detected, the ratio of the number of times of continuous image-capturing process m in the raindrop detection filter existing region with respect to the number of times of continuous image-capturing process n in the raindrop detection filter non-existing region is increased, so that the insertion cycle of the captured images, in the raindrop detection filter existing region is reduced, whereby change of rainfall can be understood with a high degree of precision.

In the present embodiment, in the raindrop detection filter existing region, an image is captured at a time when the wiper finishes wiping raindrops, and therefore, it is not necessary to increase unnecessary raindrop detection captured images, and the number of frames of the captured images for vehicle detection of white line detection can be increased.

Third Embodiment

In the raindrop detection filter non-existing region where automatic exposure is performed, the first exposure amount (exposure time) is obtained, so that the amount of light around a vehicle can be measured. When the first exposure amount is low (exposure time is short), this means a situation where the ambient brightness is high, and the weather is considered to be fine. When the weather is fine, it is less likely that the rain falls, and it is preferable to reduce the frequency of image-capturing process in the raindrop detection filter existing region.

Accordingly, in the present embodiment, when the weather is determined to be fine from the first exposure amount in the raindrop detection filter non-existing region, the ratio of the number of times of continuous image-capturing process m in the raindrop detection filter existing region with respect to the number of times of continuous image-capturing process n in the raindrop detection filter non-existing region is reduced, whereby the insertion cycle of the captured images in the raindrop detection filter existing region is increased.

Both of the schematic configuration of a vehicle-mounted device control system according to the present embodiment and the schematic configurations of an image-capturing unit 101 and an image-capturing device 200 are the same as those of the first embodiment.

In the present embodiment, more specifically, the image-capturing device 200 increases the number of times of continuous image-capturing process n in the raindrop detection filter non-existing region, and does not change the number of times of continuous image-capturing process m in the raindrop detection filter existing region, or does not change the number of times of continuous image-capturing process n in the raindrop detection filter non-existing region, and increases the number of times of continuous image-capturing process m in the raindrop detection filter existing region.

In the present embodiment, a light source control unit (not illustrated) in the image-capturing unit 101 changes the light emission intensity of the light source 202 in accordance with the first exposure amount. Basically, in the present embodiment, it is not necessary to change the amount of light, but when the outside light is too strong, the light emission intensity is changed as follows.

When the amount of light changes (for example, from 0.5 lux to about hundred thousand luxes as the amount of light), the raindrop detection filter existing region is affected by the outside light, and the background in a portion where no foreign object is attached is changed, and in the worst case, the entire region is saturated, which may disable detection of foreign object.

In this case, the light source control unit of the image-capturing unit 101 needs to emit stronger light with the light source 202 than the outside light having passed through the infrared light transmitting filter 212 in the raindrop detection filter existing region than the outside light, and preferably calculates the amount of light enters into the raindrop detection filter existing region as background, from the amount of exposure in the portion of the raindrop detection filter non-existing region, thereby changing the power of the light source in accordance with the amount thus calculated.

In this case, in accordance with the changed light emission intensity of the light source, the first exposure amount in the raindrop detection filter non-existing region may be configured to be changed.

On the contrary, at night, the outside light hardly enters, and accordingly, the light emission intensity of the light source 202 may be low. Even in such case, the light source control unit of the image-capturing unit 101 calculates the amount of light enters into the raindrop detection filter existing region as background, from the first exposure amount in the portion of the raindrop detection filter non-existing region, thereby changing the light emission intensity of the light source 202 in accordance with the amount thus calculated, so that the light emission intensity can be reduced, and low power consumption can be achieved.

Figure 18:
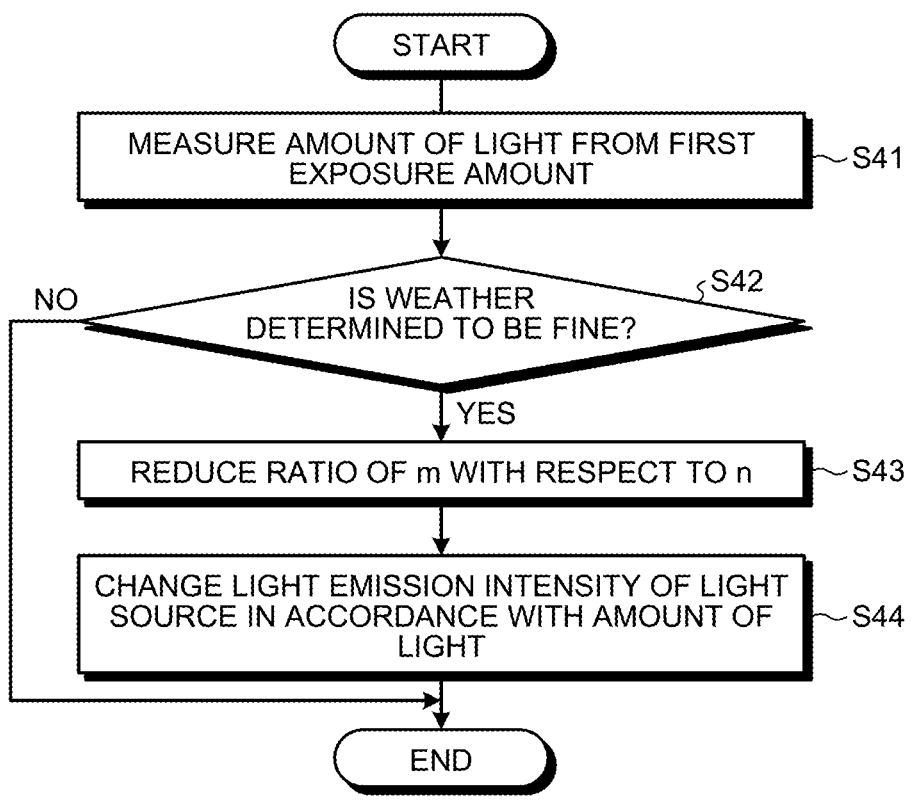
FIG. 18 is a flowchart illustrating procedure of control processing according to a third embodiment.

FIG. 18 is a flowchart illustrating procedure of the control processing according to the third embodiment. First, the image-capturing unit 101 measures the amount of light from the first exposure amount as described above (step S41). Then, the image-capturing unit 101 determines whether the weather is fine or not (step S42), and when the weather is fine (Yes in step S42), the ratio of the number of times of continuous image-capturing process m in the raindrop detection filter existing region with respect to the number of times of continuous image-capturing process n in the raindrop detection filter non-existing region is reduced (step S43).

Subsequently, the light source control unit of the image-capturing unit 101 changes the light emission intensity of the light source 202 in accordance with the amount of light as described above (step S44).

As described above, in the present embodiment, when the weather is fine, the ratio of the number of times of continuous image-capturing process m in the raindrop detection filter existing region with respect to the number of times of continuous image-capturing process n in the raindrop detection filter non-existing region is reduced, so that the insertion cycle of the captured images in the raindrop detection filter existing region is increased, whereby the frequency of image-capturing process in the raindrop detection filter existing region is reduced when the weather is fine, and the power consumption can be reduced.

In the present embodiment, the light emission intensity of the light source 202 is changed in accordance with the first exposure amount, and therefore, the power consumption can be further reduced.

Fourth Embodiment

In addition to the above embodiments, the present embodiment is configured such that, when the image analysis unit 102 detects raindrop, the image analysis unit 102 measures rainfall using, as an index, a value concerning variance of pixel values of a captured image in the raindrop detection filter existing region.

Both of the schematic configuration of a vehicle-mounted device control system according to the present embodiment and the schematic configurations of an image-capturing unit 101 and an image-capturing device 200 are the same as those of the first embodiment.

Figure 19:
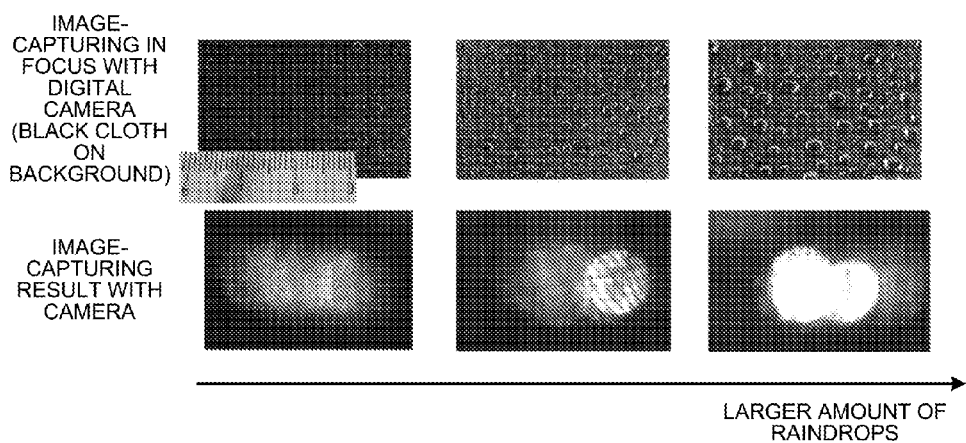
FIG. 19 is a figure illustrating an example of a captured image in a raindrop detection filter existing region when foreign object such as raindrop exists.

When an image in the raindrop detection filter existing region has foreign object such as raindrop, reflection light is generated, and accordingly, a captured image as illustrated in FIG. 19 is obtained. In the example of FIG. 19, when standard deviation values of brightness in images taken by an SWS camera are calculated, the values are 20, 27, 39, respectively, which are arranged from the left image to the right image. This indicates that there is correlation with the rainfall.

Accordingly, in the present embodiment, a rainfall calculation unit (not illustrated) of the image analysis unit 102 calculates a value concerning variance such as a standard deviation value of brightness, from a captured image in the raindrop detection filter existing region, and on the basis of the value concerning the variance, the rainfall is measured. It should be noted that the value concerning the variance includes the variance itself.

It should be noted that the amount of reflected light may be simply adopted as an index of rainfall, and in such case, it is greatly affected by change of the light emission intensity of the light source 202. For this reason, the index of rainfall is preferably obtained than the value concerning the variance of the reflection light. For example, when there is raindrop, dark and bright portions appear in the image in the raindrop detection filter existing region, and the variance increases. As the rainfall increases, many raindrops and raindrops of large sizes are attached, which increases the variance value.

As described above, in the present embodiment, the rainfall calculation unit of the image analysis unit 102 measures the rainfall using, as the index, the value concerning the variance of the pixel values in the captured image in the raindrop detection filter existing region, and the precision of the rainfall measurement can be increased.

In the present embodiment, the image analysis unit 102 may be configured so that the rainfall calculation unit of the image analysis unit 102 calculates the value concerning the variance by removing brightness values equal to or less than a predetermined threshold value from the pixel values of the captured image in the raindrop detection filter existing region.

In the raindrop detection filter existing region, a slight amount of outside light that could not be shielded by the infrared light transmitting filter 212 appears, as background, in an image in the raindrop detection filter existing region. In order to reduce this effect, the brightness values equal to or less than the predetermined threshold value in the image of the raindrop detection filter existing region are preferably removed from calculation of the value concerning the variance before the variance is calculated.

For example, before the standard deviation value is calculated, a value of 128 is subtracted from each pixel (when a result of subtraction is equal to or less than zero, zero is adopted) and thereafter, the standard deviation value is calculated. In this case, in FIG. 19, the standard deviation values are 6, 16, 29, respectively, which are arranged from the left image to the right image in FIG. 19. This indicates that there is a higher degree of correlation with the rainfall.

Therefore, there is an advantage in that this can further increase the precision in the rainfall measurement.

Fifth Embodiment

In the present embodiment, images are captured while controlling the raindrop detection filter existing region with regard to emission/non-emission of emission light from the light source 202, and rainfall is detected from an obtained captured image.

Both of the schematic configuration of a vehicle-mounted device control system according to the present embodiment and the schematic configurations of an image-capturing unit 101 and an image-capturing device 200 are the same as those of the first embodiment.

In the raindrop detection filter existing region (second region), the outside light includes light of the same wavelength as that of the light source 202, and therefore, even when the light source 202 is turned off (i.e., no light is emitted), the outside light leaked from the raindrop detection filter undesirably enters into the image sensor 206. When the outside light undesirably enters into the raindrop detection filter existing region, the brightness value obtained according to the intensity of the outside light changes regardless of the rainfall, and this degrades the accuracy of raindrop detection.

Accordingly, in the present embodiment, in the image-capturing process in the raindrop detection filter existing region by the image-capturing device 200, two images are captured continuously, which includes an image captured when the light source 202 is turned on (i.e., a state in which light is emitted) and an image captured when the light source 202 is turned off (i.e., a state in which light is not emitted), and the image analysis unit 102 performs processing to cancel the leaked outside light.

In the present embodiment, a light source control unit (not illustrated) is provided in the image-capturing unit 101, and the light source control unit controls light emission from the light source 202, thus turning on and off the light source 202.

In the image-capturing process in the raindrop detection filter existing region (second region), the image-capturing device 200 switches and performs a first image-capturing process in an off state in which the light source 202 does not emit any light and a second image-capturing process in an on state in which the light source 202 emits light.

In view of the fact that the vehicle runs and the leaked outside light is constantly changed over time, the time interval with which two captured images are captured is preferably as short as possible, and therefore, the captured image taken when the light source 202 is the ON state and the captured image taken when the light source 202 is the off state are preferably continuous frames. Therefore, more specifically, the image-capturing device 200 alternately, continuously performs the first image-capturing process and the second image-capturing process.

When the first captured image and the second captured image are captured with the same amount of exposure, the image analysis unit 102 can most improve the precision of cancellation processing of the outside light, and therefore, the image-capturing device 200 performs the first image-capturing process and the second image-capturing process with the second exposure amount which is the same amount of exposure.

The image analysis unit 102 is provided with a raindrop detection unit (not illustrated) for detecting rainfall of raindrops attached to the windshield 105. The raindrop detection unit subtracts pixel values of the first captured image obtained by the first image-capturing process, from pixel values of the second captured image obtained by the second image-capturing process in the on state, thus performing cancellation processing of the outside light.

More specifically, the raindrop detection unit performs the cancellation processing of the outside light by subtracting a summation of the pixel values of the pixels in the first captured image obtained by the first image-capturing in the off state, from a summation of the pixel values of the pixels in the second captured image obtained by the second image-capturing in the on state, and the total value obtained from this subtraction is used as an index of rainfall to detect rainfall.

In the present embodiment, as explained in the first embodiment with reference to FIGS. 4 and 5, the focal point of the image-capturing lens 204 is not on the external surface of the windshield 105, and therefore, a captured image obtained from one raindrop attached to the external surface of the windshield 105 is in a circle having substantially a constant size regardless of the size of area. However, the brightness value of the obtained captured image and the size of area of the raindrop are correlated to each other, and therefore, the size of one raindrop can be estimated from the brightness value thereof.

When many raindrops are attached to the windshield 105, many circles having brightness values according to the sizes thereof are obtained in the captured image. Therefore, in the present embodiment, as a value correlated to the size of area the raindrop on the surface to which the raindrop is attached, a summation of brightness values in a range of the captured image in the raindrop detection filter existing region, i.e., a total value of the pixel values of the captured image in the raindrop detection filter existing region, is adopted as an index of rainfall.

In this case, the raindrop detection unit can also perform cancellation processing of the outside light by subtracting, for each pixel, brightness values of the first captured image from brightness values of the second captured image. In this case, since the brightness value is subtracted for each pixel, it is necessary to store all of the pixel values of the captured image in the off state, and a storage capacity of a memory is required for the number of pixels in the raindrop detection filter existing region, which makes the price of the apparatus expensive.

In contrast, a summation of pixel values (brightness values) of the first captured image in the off state may be stored to a memory and the like, and the raindrop detection unit may subtract the summation of the pixel values (brightness values) of the first captured image in the off state of the light source 202, from the summation of the pixel values (brightness values) of the second captured image in the on state of the light source 202. In this case, only each of the summations of the pixel values of the captured image is to be calculated, and as compared with the case where the calculation is performed for each pixel, it is not necessary to have a frame buffer, and the storage capacity of the memory can be reduced.

Figure 20:
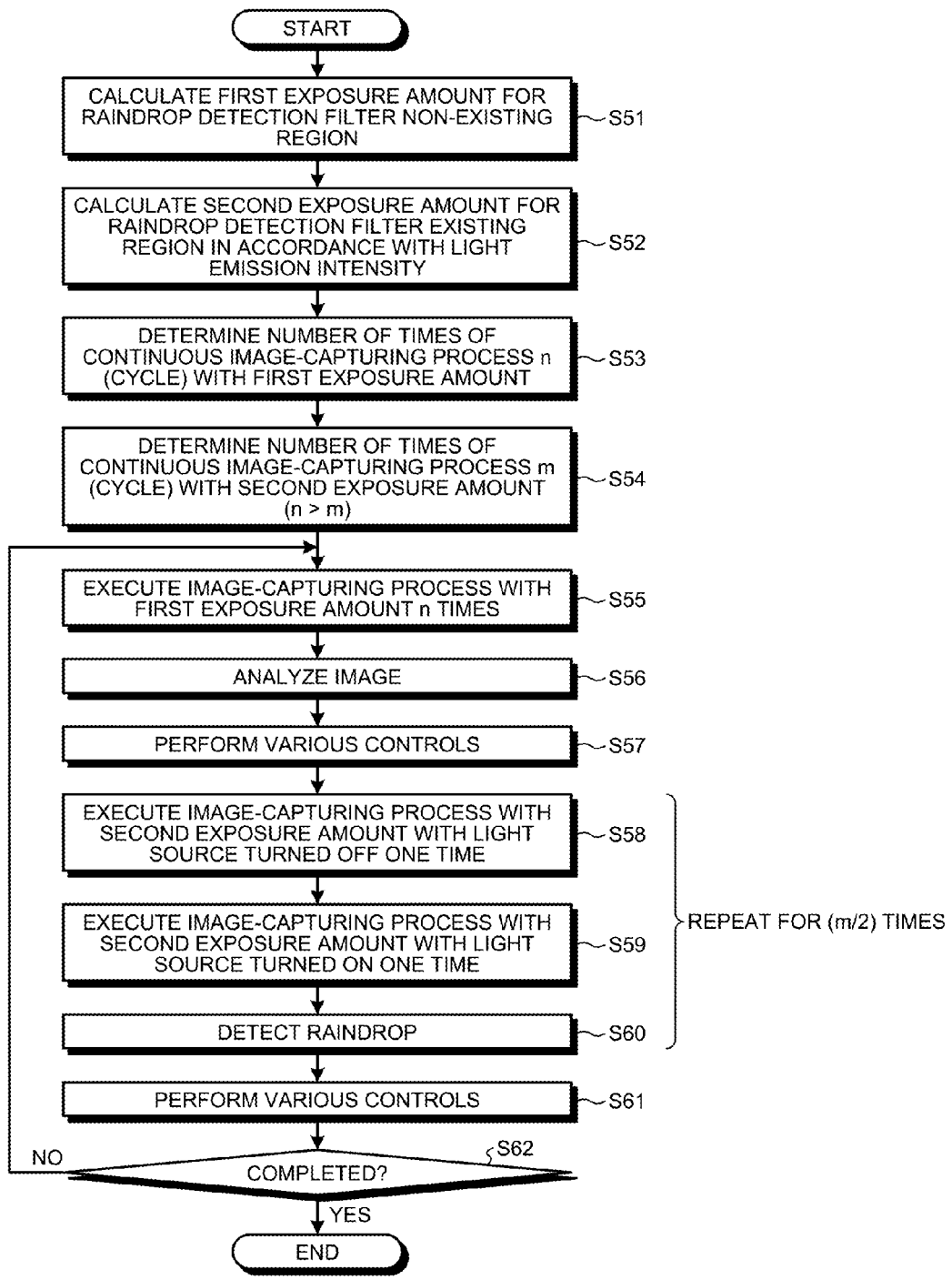
FIG. 20 is a flowchart illustrating procedure of an exposure control processing according to a fifth embodiment.

Subsequently, exposure control processing according to the present embodiment will be explained. FIG. 20 is a flowchart illustrating procedure of exposure control processing according to the fifth embodiment. First, processing from determination of the first exposure amount to determination of the number of times of continuous image-capturing process m with the second exposure amount (steps S51 to S54) are performed in the same manner as the processing of the exposure control processing according to the first embodiment in steps S11 to S14.

Then, like the first embodiment, the image-capturing device 200 continuously executes the image-capturing process with the first exposure amount in the raindrop detection filter non-existing region n times (step S55). Then, the image analysis unit 102 analyzes the captured image (step S56), and performs various kinds of controls with the head lamp control unit 103, the vehicle cruise control unit 108, and the like (step S57).

Subsequently, the image-capturing device 200 executes image-capturing process in the raindrop detection filter existing region with the second exposure amount in the off state of the light source 202 one time (step S58). Further, the image-capturing device 200 executes image-capturing process in the raindrop detection filter existing region with the second exposure amount in the on state of the light source 202 one time (step S59).

Subsequently, according to the above method, the raindrop detection unit of the image analysis unit 102 detects raindrops upon performing the cancellation processing of the outside light (step S60). Such processing from steps S58 to S60 is repeatedly executed m/2 times. Then, various kinds of controls are performed with the wiper control unit 106 and the like (step S61).

Then, until a predetermined termination instruction (a termination command given by a user and the like) is received, processing in steps S55 to S61 is repeatedly executed (No in step S62).

For example, when n is 30 and m is 2, the image-capturing device 200 continuously performs the image-capturing process suitable for the raindrop detection filter non-existing region with the first exposure amount 30 times. Thereafter, the image-capturing device 200 performs the image-capturing process in the raindrop detection filter existing region with the second exposure amount in the off state of the light source 202 one time, and continuously, the image-capturing device 200 performs the image-capturing process in the raindrop detection filter existing region with the second exposure amount in the on state of the light source 202 one time. Thereafter, the image-capturing device 200 continuously performs the image-capturing process suitable for the raindrop detection filter non-existing region with the first exposure amount 30 times. Then, the image-capturing device 200 performs the image-capturing process in the raindrop detection filter existing region with the second exposure amount in the off state of the light source 202 one time, and continuously, the image-capturing device 200 switches to perform the image-capturing process in the raindrop detection filter existing region with the second exposure amount in the on state of the light source 202 one time. It should be noted that the frequency of image-capturing process in the raindrop detection filter non-existing region may be increased.

As described above, in the present embodiment, the image-capturing process is performed in the raindrop detection filter existing region with the second exposure amount in the off state of the light source 202 one time, and continuously, the image-capturing device 200 performs the image-capturing process in the raindrop detection filter existing region with the second exposure amount in the on state of the light source 202 one time, and executes the raindrop detection upon performing the cancellation processing of the outside light, and therefore, the raindrop detection can be achieved with a high degree of accuracy while reducing the effect of the outside light.

It should be noted that any one of the image-capturing process in the off state of the light source 202 and the image-capturing process in the on state of the light source 202 may be performed first.

The first to fifth embodiments have been hereinabove explained, but various changes or modifications can be applied to the above embodiments.

First Modification

Non-linear characteristic may be given to a value obtained by subtracting a summation of pixel values (brightness values) of the first captured image in the off state of the light source 202 from a summation of pixel values (brightness values) of the second captured image in the on state of the light source 202, that is, the subtracted summation value, and the rainfall detection unit may be configured to detect rainfall on the basis of the value to which the non-linear characteristic is given.

When the rainfall is detected with the subtracted summation value, many smaller raindrops having the same size of area are detected as high rainfall rather than one large raindrop. Therefore, in this modification, non-linear component is given to the subtracted summation value, whereby it can be made into a more accurate index of rainfall.

An example for giving non-linear characteristic includes a method for calculating the index of rainfall using the following expression, but is not limited thereto.

$$rain\_amount=\exp(sum(img(x,y)\times coeff1-1)$$

where rain_amount is rainfall index, img(x,y) is brightness value of raindrop detection filter existing region, sum( ) is summation calculation operator of pixel values in raindrop detection filter existing region, coeff1 is coefficient, and the coefficient coeff1 can be appropriately obtained through experiment.

Second Modification

When the raindrop detection unit performs the cancellation processing of the outside light by deducing, for each pixel, pixel values of the first captured image in the off state from pixel values of the second captured image in the on state, the rainfall detection unit may be configured to give, for each pixel, non-linear characteristic to the values obtained by deducing the pixel values of the first captured image from the pixel values of the second captured image, obtain a summation value of the values to which the non-linear characteristic is given, and detect the rainfall on the basis of the obtained summation value, so that rainfall can be detected more accurately.

An example for giving non-linear characteristic includes a method for calculating the index of rainfall using the following expression, but is not limited thereto.

$$rain\_amount=sum(\exp(img(x,y)\times coeff2-1))$$

where rain_amount is rainfall index, img(x,y) is brightness value of raindrop detection filter existing region, sum( ) is summation calculation operator of pixel values in raindrop detection filter existing region, and coeff2 is coefficient.

The coefficient coeff2 can be appropriately obtained through experiment.

Third Modification

Figure 21:
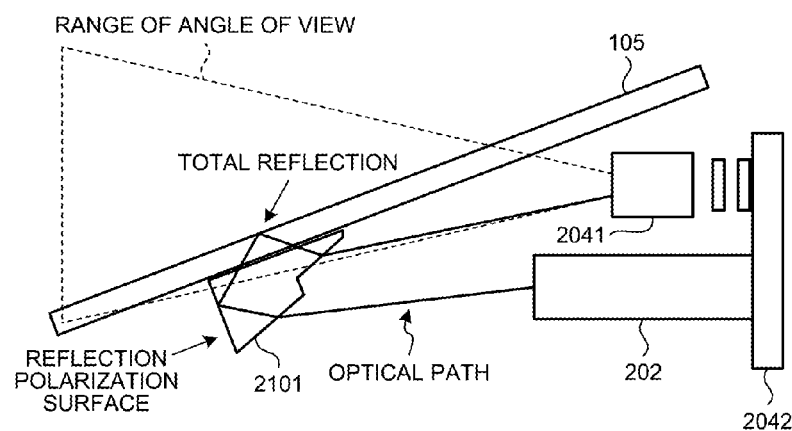
FIG. 21 is a configuration diagram illustrating an optical system of an image-capturing unit according to a third modification.

In the first to fifth embodiments, the optical system of the image-capturing unit 101 is what is illustrated in FIG. 2. In the third modification, the image-capturing unit 101 is a total reflection optical system. FIG. 21 is a configuration diagram illustrating an optical system of an image-capturing unit 101 according to the third modification.

In the image-capturing unit 101 according to the present embodiment, light emitted from the light source 202 enters a reflection polarization member 2101 provided on a side of the windshield 105 inside of the vehicle as illustrated by an optical path of FIG. 21, and is totally reflected by the external surface of the windshield 105 and enters an image-capturing lens 2041, and is received by an image sensor 20 of a sensor substrate 2042.

Figure 22:
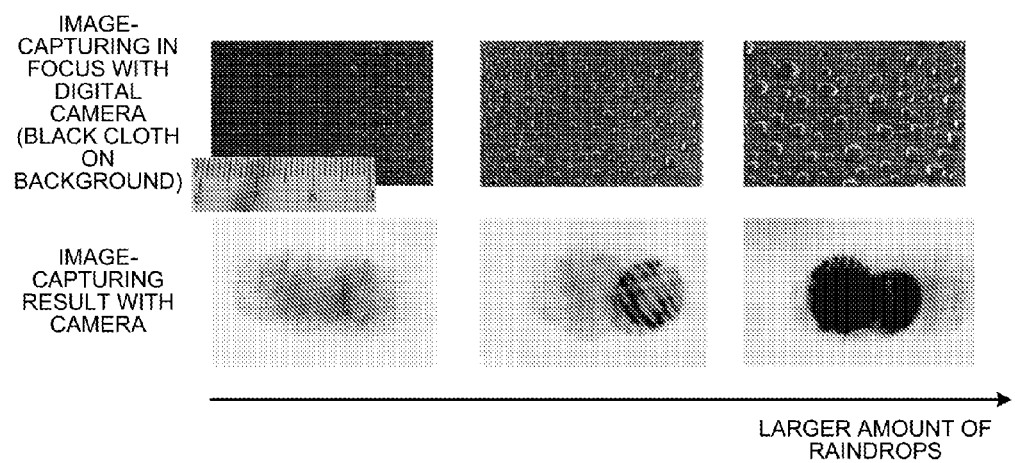
FIG. 22 is a figure illustrating an example of a captured image by the optical system of the third modification.

When the optical system of the total reflection as illustrated in FIG. 21 is used, the obtained captured image is reversed as compared with the optical system of the image-capturing unit 101 according to the first to fifth embodiments. FIG. 22 is a figure illustrating an example of a captured image by the optical system according to the third modification. As can be understood from the example of FIG. 22, it is what is obtained by reversing the captured image in the example as illustrated in FIG. 19 of the fourth embodiment. More specifically, portions to which raindrops are attached become dark, and portions to which raindrops are not attached become bright.

In the optical system of the image-capturing unit 101 according to the first to fifth embodiments, the higher the rainfall is, the higher the value of the processing result becomes. On the contrary, the optical system according to the present embodiment using total reflection is configured such that the higher the rainfall is, the smaller the value of the processing result becomes. However, the analysis processing of the captured image is performed in the same manner as the processing of the first to fifth embodiments.

In order to make the rainfall which is the processing result provided by the rainfall detection unit according to this modification into a form that can be more easily treated by the wiper control and the like, the rainfall detection unit may be configured to compare the rainfall with a threshold value and transmit, to the wiper control unit 106, the rainfall in a stepwise manner as shown in the following table, for example.

| Rainfall | Output to wiper control unit | Definition |
| --- | --- | --- |
| 0.0 to 0.1 | 0 | no rain |
| 0.1 to 0.3 | 1 | little rain |
| 0.3 to 0.5 | 2 | rain |
| 0.5 to 0.7 | 3 | heavy rain |
| 0.7 to 1.0 | 4 | very heavy rain |

Accordingly, what is received by the wiper control unit 106 is five levels, i.e., 0 to 4, which is information to which meaning is given and which can be easily handled. As compared with a case where the value of rainfall is transmitted as it is, the amount of data is reduced which makes it more efficient.

Each processing executed by the vehicle-mounted device control system according to each of the embodiments can be achieved with hardware, or may be achieved with a program. In this case, each processing program executed by the vehicle-mounted device control system according to each embodiment is provided upon being incorporated into a ROM and like.

Each processing program executed by the vehicle-mounted device control system according to the above embodiments may be configured to be provided upon being recorded to a computer-readable recording medium such as a CD-ROM, a flexible disk (FD), a CD-R, and a digital versatile disk (DVD) in a file in an executable format or an installable format.

Further, each processing program executed by the vehicle-mounted device control system according the above embodiments may be configured to be provided as follows: each processing program is stored to a computer connected to a network such as the Internet so that each processing program can be downloaded via the network. Each processing program executed by the vehicle-mounted device control system according the above embodiments may be configured to be provided or distributed via a network such as the Internet.

Each processing program executed by the vehicle-mounted device control system according the above embodiments is modularized and includes the above modules and units. In an actual hardware implementation, a CPU (processor) reads and executes each processing program from the above ROM. Accordingly, the above modules and units are loaded to a main storage device, and the above modules and units are generated on the main storage apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An image processing apparatus comprising:
a light source configured to emit light onto a glass;
an image-capturer configured to capture light from an image-capturing region including reflection light of the emitted light, the reflection light being reflected by the glass;
an object detection filter used to detect an object attached to the glass, and light from a portion of the image-capturing region entering the object detection filter; and
a processor configured to:
determine, via an exposure controller, a first exposure amount with which an image is captured in a first region of the image-capturing region and a second exposure amount with which an image is captured in a second region of the image-capturing region, the second exposure amount being different from the first exposure amount, the first region being a region where the object detection filter does not exist, the second region being a region where the object detection filter exists, and
analyze, via an image analyzer, a captured image obtained by the image-capturer, wherein:
the image-capturer is configured to switch an exposure amount used in an image-capturing process for the image-capturing region between the first exposure amount and the second exposure amount,
the image-capturer is configured to continuously perform the image-capturing process with the first exposure amount a set first number of times, and then continuously perform the image-capturing process with the second exposure amount a set second number of times,
the image analyzer is further configured to detect an object on the glass by analyzing the captured image, and
the image-capturer is configured to increase a ratio of the second number of times with respect to the first number of times when the object is detected.

2. The image processing apparatus according to claim 1, wherein
the object is a raindrop, and
the image processing apparatus further comprises:
a wiper configured to remove the raindrop on the glass; and
the processor includes a wiper controller configured to control driving of the wiper,
wherein the image-capturer is configured to perform the image-capturing process with the second exposure amount in synchronization with the driving of the wiper.

3. The image processing apparatus according to claim 1, wherein the image-capturer is configured to determine whether or not weather is clear on the basis of an amount of light received by the image-capturer, and when the weather is clear, the image-capturer decreases the ratio of the second number of times with respect to the first number of times.

4. The image processing apparatus according to claim 1, wherein the processor further includes a light source controller configured to control emission of the light from the light source,
wherein the image-capturer is configured to switch the image-capturing process for the second region between a first image-capturing process in an off state in which the light source does not emit the light and a second image-capturing process in an on state in which the light source emits the light.

5. The image processing apparatus according to claim 4, wherein
the object is a raindrop, and
the processor includes a rainfall detector configured to subtract a pixel value of a first captured image obtained from the first image-capturing process from a pixel value of a second captured image obtained from the second image-capturing process, and configured to detect rainfall on the basis of a value obtained by the subtraction.

6. An image-capturing method executed by an image processing apparatus that includes a light source configured to emit light onto a glass and an object detection filter used to detect an object attached to the glass, and light from a portion of an image-capturing region entering the object detection filter, the image-capturing method comprising:
capturing light from an image-capturing region including reflection light of the emitted light, the reflection light being reflected by the glass;
determining a first exposure amount with which an image is captured in a first region of the image-capturing region and a second exposure amount with which an image is captured in a second region of the image-capturing region, the second exposure amount being different from the first exposure amount, the first region being a region where the object detection filter does not exist, the second region being a region where the object detection filter exists;
analyzing a captured image obtained at the capturing; and
detecting an object on the glass by analyzing the captured image, wherein:
the capturing includes switching an exposure amount used in an image-capturing process for the image-capturing region between the first exposure amount and the second exposure amount,
the capturing includes continuously performing the capturing process with the first exposure amount a set first number of times, and then continuously performing the capturing process with the second exposure amount a set second number of times, and
the capturing includes increasing a ratio of the second number of times with respect to the first number of times when the object is detected.

7. A vehicle comprising:
a light source configured to emit light onto a glass;
an image-capturer configured to capture light from an image-capturing region including reflection light of the emitted light, the reflection light being reflected by the glass;
an object detection filter used to detect an object attached to the glass,
and light from a portion of the image-capturing region entering the object detection filter;

a processor configured to:
  determine, via an exposure controller, a first exposure amount with which an image is captured in a first region of the image-capturing region and a second exposure amount with which an image is captured in a second region of the image-capturing region, the second exposure amount being different from the first exposure amount, the first region being a region where the object detection filter does not exist, the second region being a region where the object detection filter exists;
  analyze, via an image analyzer, a captured image obtained by the image-capturer; and
  control at least one of a cruise, a wiper, and a head lamp of the vehicle on the basis of an analysis result of the captured image, wherein:
the image-capturer is configured to switch an exposure amount used in an image-capturing process for the image-capturing region between the first exposure amount and the second exposure amount,
  the image-capturer is configured to continuously perform the image-capturing process with the first exposure amount a set first number of times, and then continuously perform the image-capturing process with the second exposure amount a set second number of times,
  the image analyzer is further configured to detect an object on the glass by analyzing the captured image, and
  the image-capturer is configured to increase a ratio of the second number of times with respect to the first number of times when the object is detected.

8. The image processing apparatus according to claim 1, wherein the processor is configured to determine the first exposure amount based on an amount of light in the first region.

9. The image processing apparatus according to claim 1, wherein the processor is configured to determine the second exposure amount based on light emission intensity of the light source.

10. The image processing apparatus according to claim 1, wherein the set first number of times is less than the set second number of times.

* * * * *